(12) United States Patent
Batruni

(10) Patent No.: US 10,740,341 B1
(45) Date of Patent: Aug. 11, 2020

(54) SINGLE- AND MULTI-VARIATE TENSOR SPECTRAL ANALYSIS

(71) Applicant: Cyber Atomics, Inc., Danville, CA (US)

(72) Inventor: Roy Batruni, Danville, CA (US)

(73) Assignee: Cyber Atomics, Inc., Danville, CA (US)

( * ) Notice: Subject to any disclaimer, the term of this patent is extended or adjusted under 35 U.S.C. 154(b) by 190 days.

(21) Appl. No.: 15/944,474

(22) Filed: Apr. 3, 2018

Related U.S. Application Data

(60) Provisional application No. 62/481,586, filed on Apr. 4, 2017.

(51) Int. Cl.
*G06F 16/2458* (2019.01)
*G06F 16/22* (2019.01)
*G06F 16/248* (2019.01)

(52) U.S. Cl.
CPC ...... *G06F 16/2465* (2019.01); *G06F 16/2264* (2019.01); *G06F 16/248* (2019.01)

(58) Field of Classification Search
CPC .......... G06F 16/2423; G06F 16/2465
See application file for complete search history.

(56) References Cited

U.S. PATENT DOCUMENTS

2006/0080300 A1\* 4/2006 Gruenwald ......... G06F 16/2423

\* cited by examiner

*Primary Examiner* — Etienne P Leroux
(74) *Attorney, Agent, or Firm* — Van Pelt, Yi & James LLP

(57) ABSTRACT

Tensor analysis includes: obtaining a set of Fourier domain singular value decomposition (SVD) factors of a first tensor representing data in multiple dimensions, including: performing Fourier transform on the first tensor along a first dimension to obtain a Fourier domain tensor; performing SVD on the Fourier domain tensor to obtain a first set of Fourier domain SVD tensors; performing inverse Fourier transform on at least some of the first set of Fourier domain SVD tensors to obtain a set of native domain tensors; performing Fourier transform on at least some of the set of native domain tensors to obtain a second set of Fourier domain tensors; performing SVD on at least some of the second set of Fourier domain tensors to obtain a second set of Fourier domain SVD tensors; obtaining an SVD result based at least in part on the set of Fourier domain SVD factors of the first tensor; and outputting at least a portion of the SVD result.

22 Claims, 21 Drawing Sheets

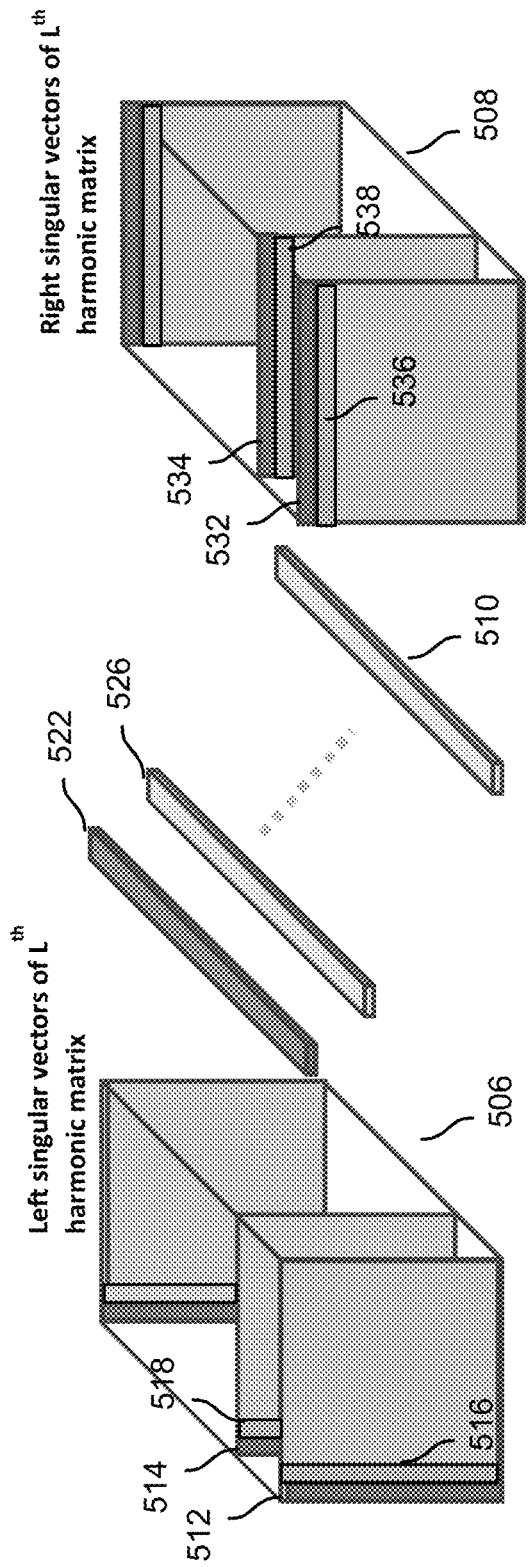
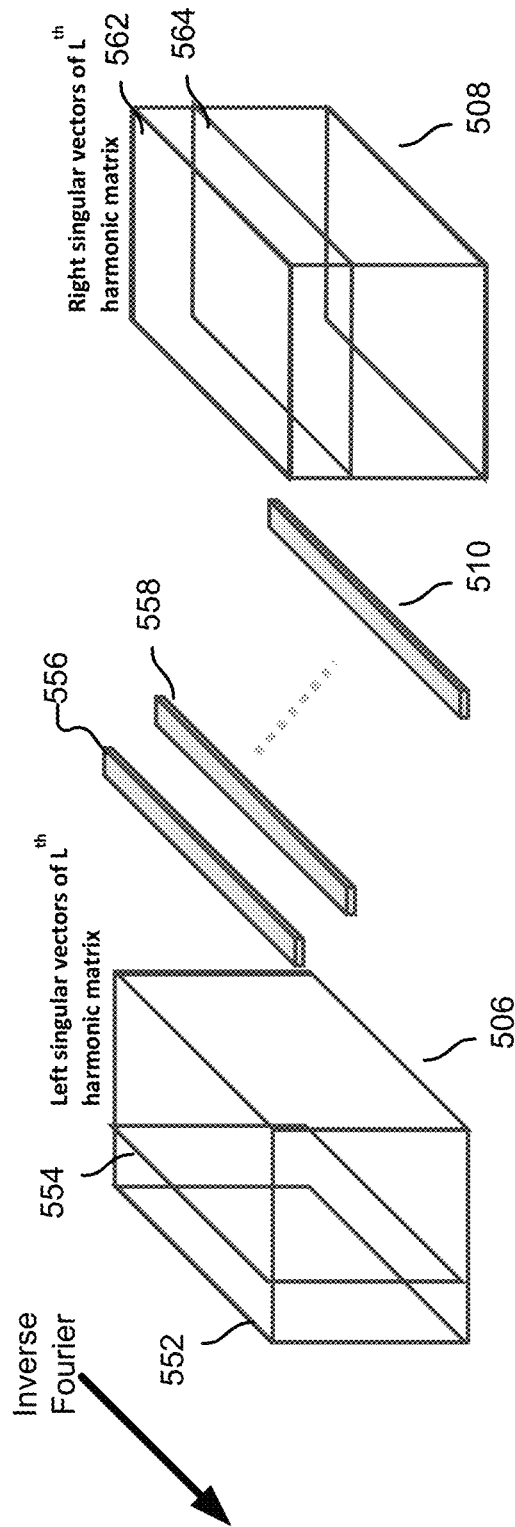
FIG. 5C
FIG. 5D

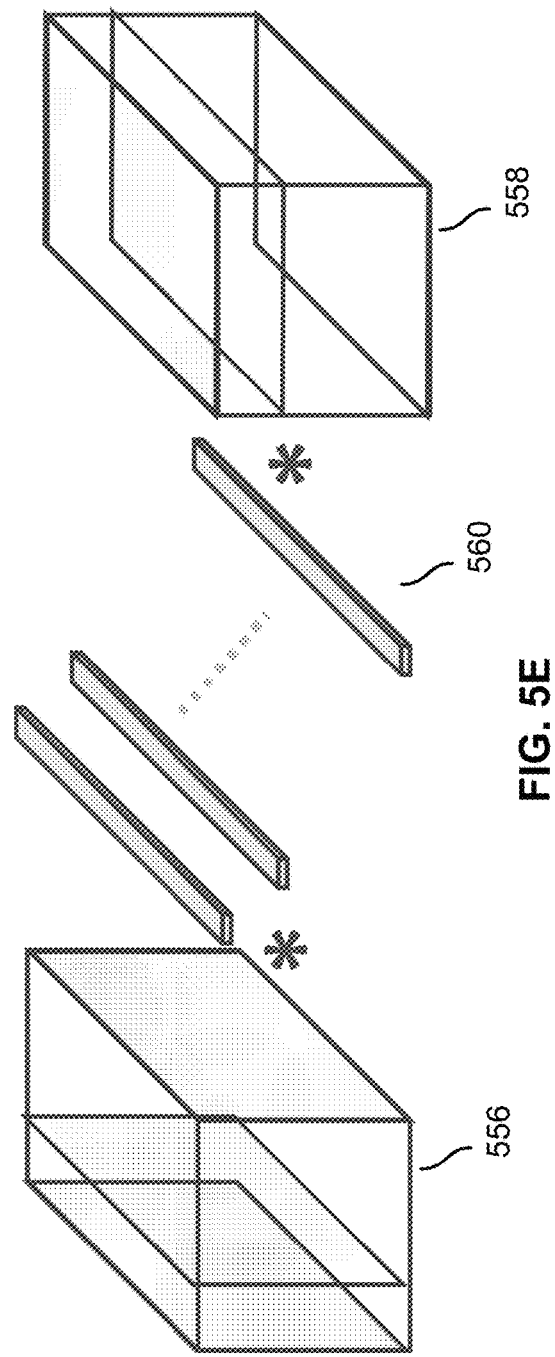
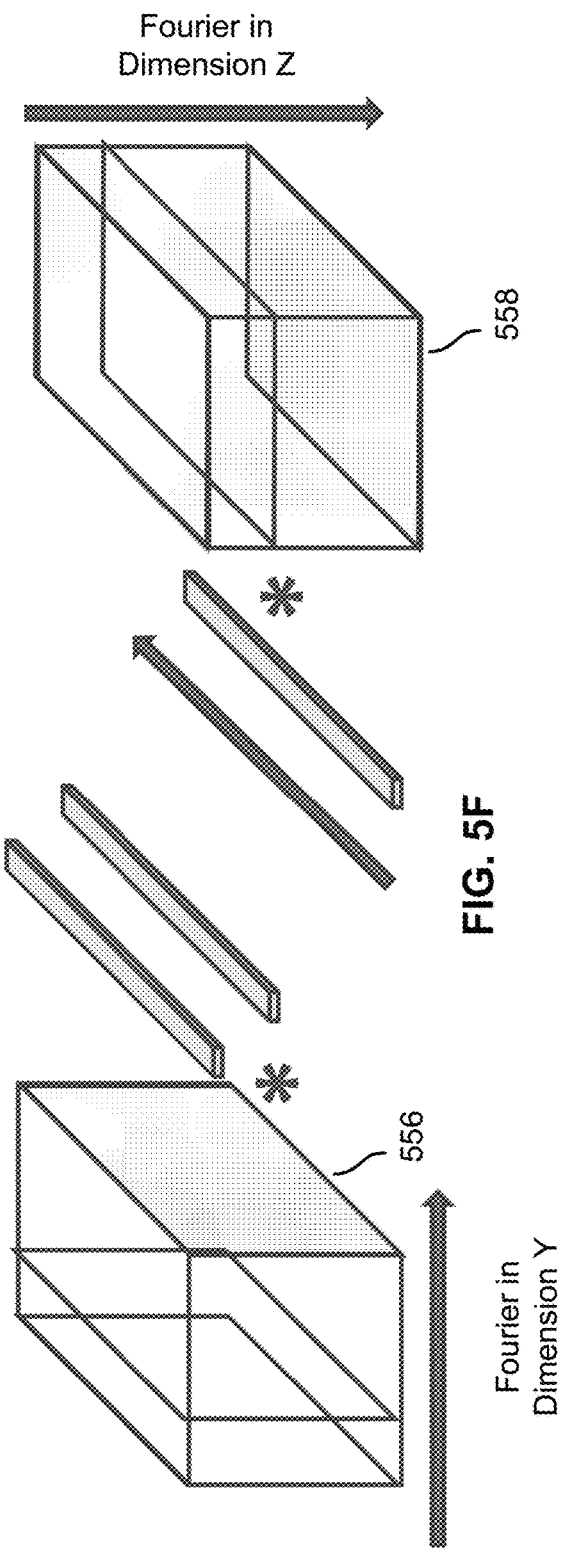
FIG. 5E
FIG. 5F

1

SINGLE- AND MULTI-VARIATE TENSOR SPECTRAL ANALYSIS

CROSS REFERENCE TO OTHER APPLICATIONS

This application claims priority to U.S. Provisional Patent Application No. 62/481,586 entitled SINGLE- AND MULTI-VARIATE SPECTRAL ANALYSIS filed Apr. 4, 2017 which is incorporated herein by reference for all purposes.

BACKGROUND OF THE INVENTION

Existing data analysis techniques typically represent data in a 2-dimensional space, even if the data is complex and represents many different sets of possibly related information. For example, to analyze consumer purchasing volume for purposes of making predictions/product recommendations, existing techniques typically treat factors that affect purchasing behavior independently and separately analyze pairs of relationships. The analysis is typically done using matrices. For example, data such as inflation rate—purchasing volume, consumer price index—purchasing volume, and exchange rate—purchasing volume can be used to form matrices which are analyzed to determine how factors such as inflation rate, consumer price index, and exchange rate individually affect purchasing volume. Because the analysis treats separate factors independently, the results are often limited in terms of providing insight into complex relationships among the data and how different factors may influence each other.

Attempts to analyze data in multiple dimensions have been made but many existing techniques incorrectly interpret the relationships of multidimensional data and therefore often lead to inaccurate and/or inconsistent results. For example, incorrect analysis would lead to an inaccurate data model, which in turn leads to inconsistent predictions.

Furthermore, existing analysis techniques are often computationally intensive and require large amounts of memory and/or storage space for large data sets.

It would therefore be useful to have a way of analyzing multidimensional data that produces accurate and consistent results, that is computationally efficient, and that saves memory and/or storage space.

BRIEF DESCRIPTION OF THE DRAWINGS

Various embodiments of the invention are disclosed in the following detailed description and the accompanying drawings.

FIGS. 5A-5K illustrate a process for obtaining the SVD result for the first tensor.

FIG. 7C illustrates the left-left singular vectors tensors 702a, 704a, and 706a.

DETAILED DESCRIPTION

Figure 1:
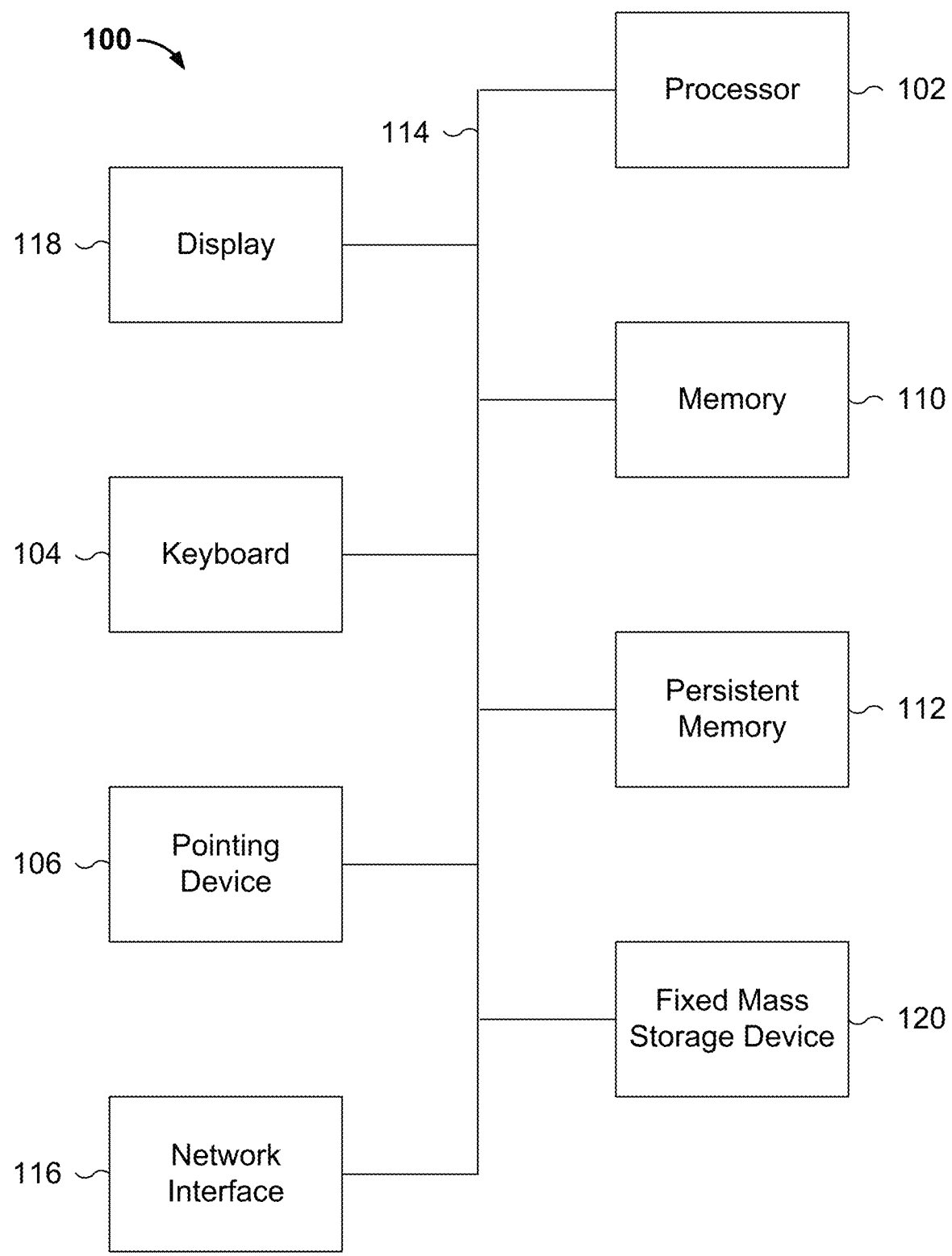
FIG. 1 is a functional diagram illustrating a programmed computer system for performing spectral analysis of tensors in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A tensor refers to a data structure comprising one or more arrays representing data in one or more dimensions. As used herein, a tensor refers to data arranged in three or more dimensions. A variate refers to a single entity taking scalar values over one or more dimensions. A dimension refers to an independent continuum over which one or more variates act as dependent variables (where the dimension continuum induces changes in the variate), and can induce a moment-generating function (in other words, the variate can have derivatives with respect to the dimension continuum). A variate can be defined over multiple independent dimensions, thus inducing a multidimensional differential or difference equation. One or more multidimensional variates can be represented using one or more multidimensional tensors.

Existing analysis of multidimensional data (tensors) is typically restricted to processing data in its raw, recorded form (referred to as "native domain" analysis). Such processing tends to offer limited insight, since it would be difficult to determine the energy content of the data using such techniques. The present application provides a technique to analyze the spectral content of tensors by performing Fourier transform on the tensors and decomposing the signal to determine the components of the tensors. The technique provides insight into the energy content of the tensor in multiple dimensions.

FIG. 1 is a functional diagram illustrating a programmed computer system for performing spectral analysis of tensors in accordance with some embodiments. As will be apparent, other computer system architectures and configurations can be used to perform spectral analysis of tensors. Computer system 100, which includes various subsystems as described below, includes at least one microprocessor subsystem (also referred to as a processor or a central processing unit (CPU)) 102. For example, processor 102 can be implemented by a single-chip processor, by multiple chips, by one or more processing elements such as integrated circuits and/or logic components, or the like. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide spectral analysis of tensors.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized. For example, in various embodiments, a client-server architecture and/or a cloud-based architecture comprising multiple computer systems, virtual machines, or the like, can be used to provide the functions described below. As another example, systems implemented using integrated circuits (ICs), field programmable gate arrays (FPGAs), programmable array logic (PALs), graphics processing units (GPUs), and/or other appropriate hardware can be used.

Figure 2A:
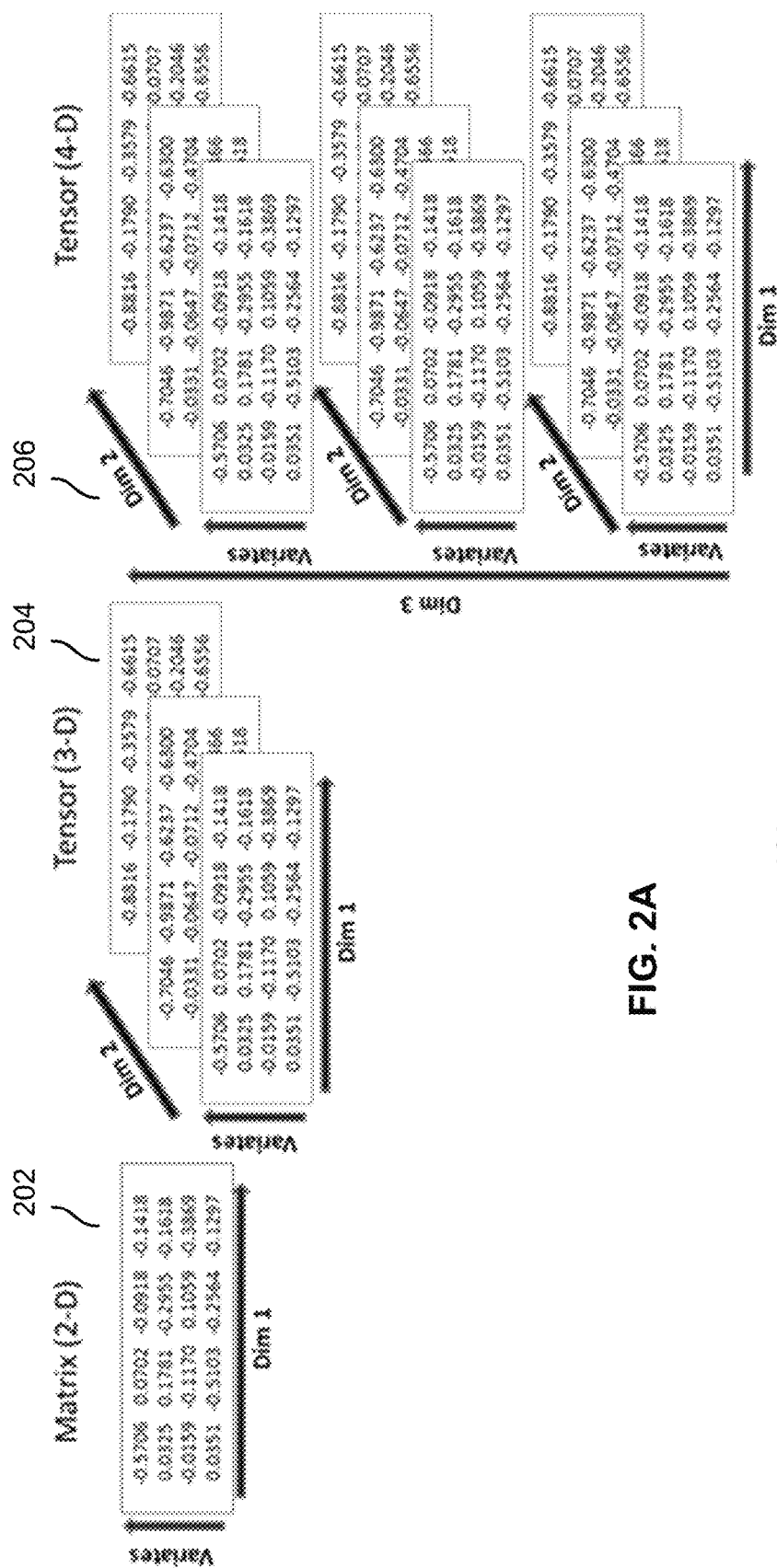
FIG. 2A is a diagram illustrating examples of ways to visualize tensors.

FIG. 2A is a diagram illustrating examples of ways to visualize tensors. As shown, matrix 202 is a 2-dimensional tensor. The variates can represent individual entities whose relevant data is measured and analyzed. The definitions of the variates can vary depending on application. For example, in an e-commerce platform analytics application the variates can represent individual users; in a network analysis application the variates can represent individual devices; in a chemical analysis application the variates can be different chemical compounds, etc. The dimensions can represent various measurements, such as monthly spending and inflation rate in an application that predicts spending pattern of e-commerce platform users, bandwidth and blocked traffic rate in a network application, concentrations of various chemical products and byproducts, etc. In this example, tensor 204 is a 3-dimensional tensor with variates that are along the vertical axis and that change along dimensions 1 and 2 (shown as dim 1 and dim 2). Tensor 206 is a 4-dimensional tensor, with variates that are along the vertical axis and that change along dimensions 1, 2, and 3 (shown as dim 1, dim 2, and dim 3). A tensor can be represented as a group of "slices" or discrete 2-dimensional matrices. A higher dimensional tensor would include additional groups of matrices in more dimensions.

Figure 2B:
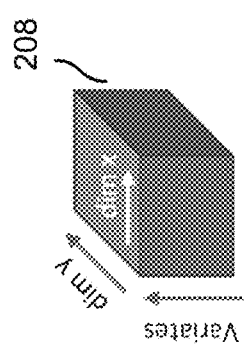
FIG. 2B is a diagram illustrating an example of a 3-dimensional tensor.

FIG. 2B is a diagram illustrating an example of a 3-dimensional tensor. Details of the elements in tensor 208 are not shown and the tensor is represented using a 3-dimensional block with variates that are along the vertical axis and that change along dimensions 1 and 2 (shown as dim x and dim y). For ease of illustration this tensor representation is used in some of the examples below.

Figure 2C:
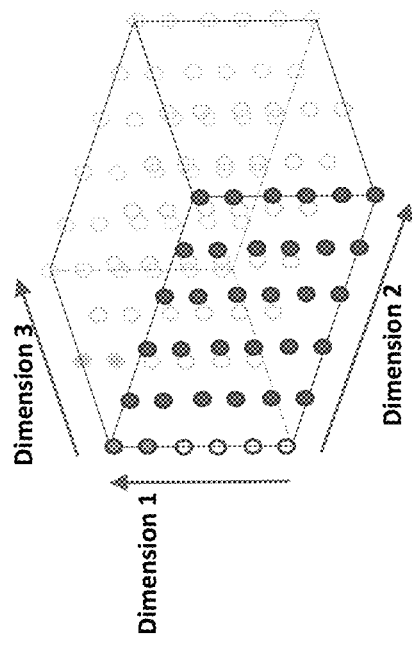
FIG. 2C is a diagram illustrating an example of a trellis cuboid.

In some embodiments, a tensor represents data corresponding to the values of the variate at the various values for the other dimensions. Such data is gathered to construct a 3-dimensional trellis. FIG. 2C is a diagram illustrating an example of a trellis cuboid denoted as A(N,M,L) which represents a single variate over three dimensions Dimension 1, Dimension 2, and Dimension 3 (also represented as D1(:), D2(:), and D3(:)). For example, the vector A(:, 1, 1) (the front-left column of the cuboid) represents the values the variate takes over dimension 1 D1(:) for fixed values of D2(1) of dimension 2 and D3(1) of dimension 3. This 3-D tensor can be construed as a predictive model or equivalently transfer function for the variate in question. If we have a priori knowledge of the values of the tensor in all dimensions then the cuboid lattice coordinate {i,j,k} is the value of the tensor prediction output at that coordinate. Therefore knowing the values of the dimensions predicts the value of the variate.

To understand how the variate behaves, the rates of change of this variate with respect to the multiple dimensions over which it is defined are analyzed. If the behavior of the variate is treated as a signal, an efficient method to model rates of change for the signal is to compute its Fourier spectrum. If the signal does not change over a particular dimension then only a DC component is generated by the Fourier transform; if a pure oscillatory mode governs the behavior of the signal over the dimension in question then a pure harmonic is generated by Fourier transform. This is a Fourier-domain dual of an actual derivative with respect to the native domain of the dimension in question.

In the discrete realm, Fourier transform transforms a sequence of native domain values $x_n$, (n=0, 1, ..., N-1) to another sequence of Fourier domain values $X_k$ (k=0, 1, ..., N-1) according to $$X_k = \sum_{n=0}^{N-1} x_n e^{-j2\pi kn/N}$$

To perform Fourier transform on a tensor in a desired dimension, vectors are formed based on the tensor in the desired dimension.

Figure 2D:
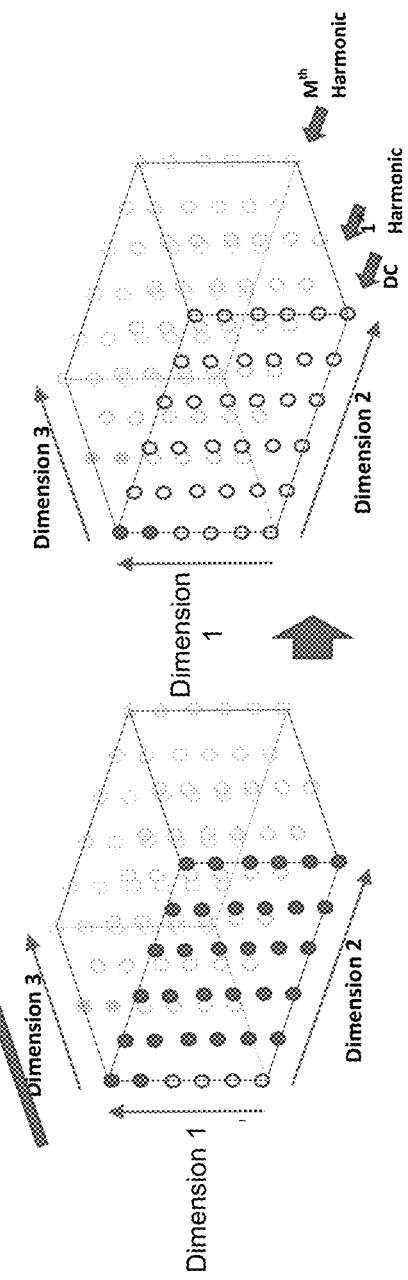
FIG. 2D illustrates a tensor that undergoes Fourier transform in dimension 3 and the resulting harmonics.

For example, when vector A(1,1, :) undergoes Fourier transform, the spectrum (which in turn reflects the rates of change modes) of the variate with respect to dimension 3 given fixed values of dimensions 1 and 2 is obtained. If the variate does not change with respect to dimension 3, the Fourier transform yields only a DC component; if the variate changes in a pure oscillatory mode, then the Fourier transform extracts a single harmonic; if the variate changes in multiple oscillatory modes, the Fourier transform extracts a combination of the harmonics. To obtain the Fourier transform of the tensor in a specific dimension, all vectors in the tensor along that dimension are transformed. FIG. 2D illustrates a tensor that undergoes Fourier transform in dimension 3 and the resulting harmonics. As shown, vectors along dimension 3 such as A(1,1,:), A(1,2,:), A(2,2,:), etc. undergo Fourier transform to obtain the Fourier transform of A along dimension 3. Similarly, other vectors such as A(1,:,1), A(5, 3,:), etc., each yield the differential/spectral behavior of the variate along a chosen dimension given fixed values of the two other dimensions.

The variate's model can be evaluated in the "native" domain (where each dimension reflects the real-world problem being modeled, for example, the dimensions can be time, interest rates, exchange rates, etc.), and in the Fourier domain which is the dual of the native domain. In some embodiments, the model's behavior over a particular dimension is analyzed (i.e., in the direction of one dimension). For example, FIG. 2D shows how to model the variate's behavior as dimension 3 changes. The frontal planes of the cuboid represent the relationships between dimensions 1 and 2 at different steps or increments of dimension 3. The 2-dimensional spectral components of the variate along dimension 3 are obtained by taking the Fourier transform along the tubal direction (dimension 3). The first resulting Fourier frontal plane (matrix) is the "DC" component, the second plane represents the first harmonic, the last plane is the M-th harmonic, etc.

In some embodiments, 2-dimensional Fourier transform is performed. For example, 2-dimensional Fourier transform of A(:,:,1) yields the rates of change of the variate with respect to both dimensions 1 and 2 given value 1 for dimension 3. This computation is a dual of the 2-dimensional differential equation that governs the variate with respect to dimensions 1 & 2 given a fixed value in dimension 3. Again, as an example, if the variate does not actually vary as a function of dimensions 1 and 2, the 2-D Fourier transform yields a DC value with all other components in the 2-D Fourier spectrum being equal to zero.

In some embodiments, 3-dimensional Fourier transform is performed which leads to a dual of a 3-dimensional differential model of the variate's behavior over dimensions 1, 2 and 3.

As will be described in greater detail below, a singular value decomposition (SVD) technique in the Fourier domain is used to extract the most significant components of the tensor for examining the dependencies and their importance to the variate's behavior. The technique also facilitates the generation of a de-noised version of the tensor by expressing the model as an expansion of the most significant component(s). Further, the technique allows for storing the singular vector(s)/value(s) that are most significant and thus achieving compression/storage space reduction.

In some embodiments, SVD is performed over the spectral matrices (e.g., the frontal planes of the cuboid) in order to examine the most significant contributors to the DC component, the $1^{st}$ harmonic matrix, etc.

Generally, a matrix A can be written in terms of its singular value components as:

$$A = U \Sigma V'$$

where $U=[u_1, u_2, \ldots, u_M]$ and is the left singular vectors matrix whose columns $u_j$ are the left singular vectors of A, $$\Sigma = \begin{bmatrix} \sigma_1 & 0 & 0 \\ 0 & \ddots & 0 \\ 0 & 0 & \sigma_N \end{bmatrix}$$

and is the singular values matrix whose diagonal terms $\sigma_j$ are the singular values of A, and $V=[v_1, v_2, \ldots, v_N]$ and is the right singular vectors matrix whose columns are the right singular vectors of A. V' is the transpose of V, and U and V are orthonormal. The matrix can be written in its Frobenius expansion form as follows:

$$A = \sigma_1 u_1 v'_1 + \sigma_2 u_2 v'_2 + \ldots + \sigma_N u_N v'_N$$

Because the singular vectors/values are ordered, $\sigma_1 u_1 v'_1$ represents the most dominant set of terms that contribute to the greatest energy content in the matrix, $\sigma_2 u_2 v'_2$ represents the set of second most dominant terms, etc.

From the point of view of the Fourier domain spectrum taken along one dimension only, taking the dominant components of the SVD entails taking the dominant singular vectors and value of each of the Fourier-domain matrix harmonics. In the native domain, the singular "vectors" on the left and the right form matrices, and the singular "values" form vectors. Because multiplication in the Fourier-domain translates into convolution in the native domain, the inverse Fourier transform produces a convolution between the left singular "vectors" (matrix), the singular "values" (vector), and the right singular "vectors" (matrix).

Removing the dominant components of the SVD from the overall original tensor eliminates the highest amount of energy from the tensor. In other words, this dominant component decomposition represents the highest amount of energy or information present in the raw tensor.

Figure 3A:
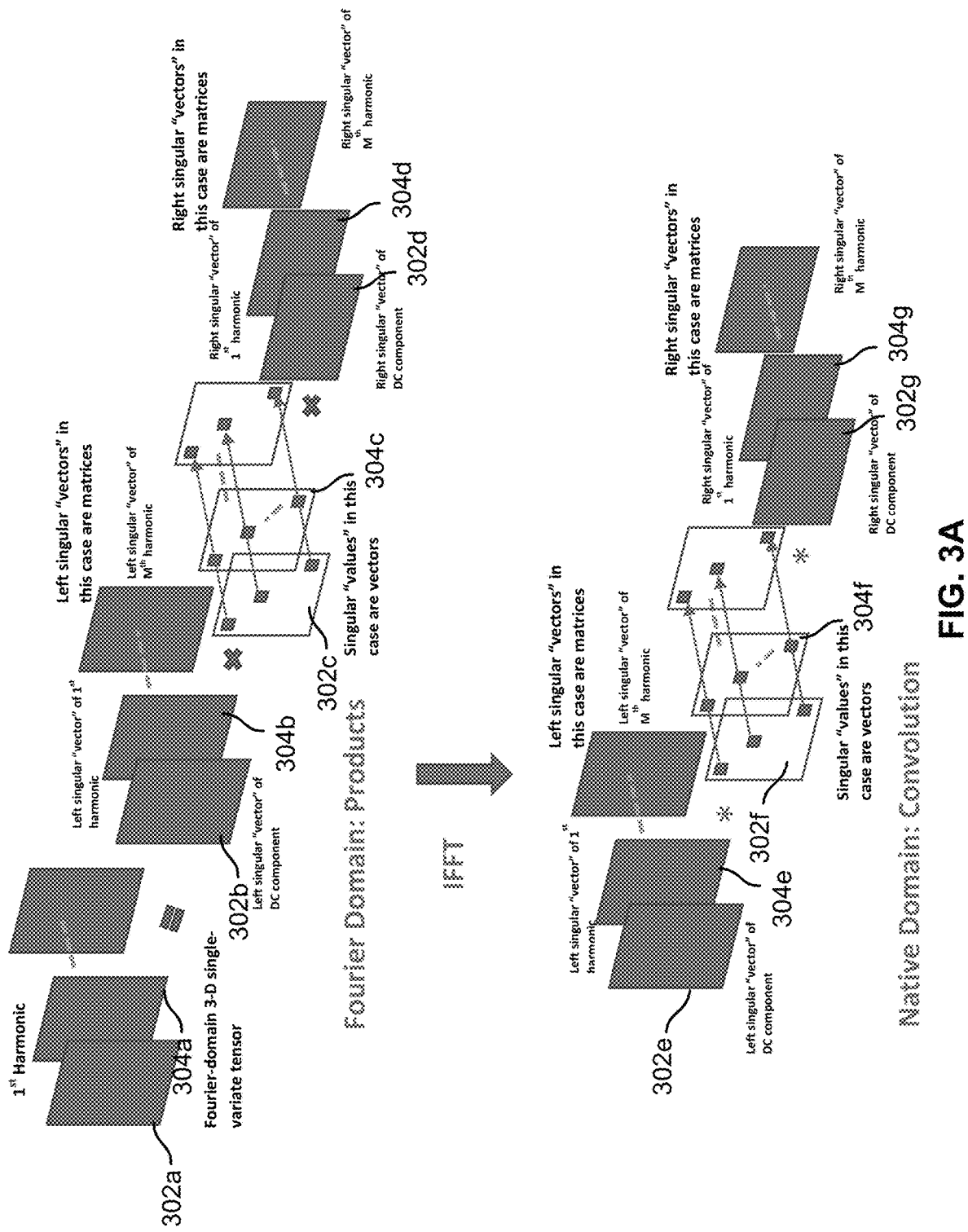
FIG. 3A is a diagram illustrating the tensor that undergoes singular value decomposition in the Fourier domain and inverse Fourier transform.

FIG. 3A is a diagram illustrating the tensor that undergoes singular value decomposition in the Fourier domain and inverse Fourier transform.

In this case, Fourier transform is performed along one dimension of the 3-dimensional tensor. The Fourier domain transformed tensor includes multiple harmonic matrices (e.g., DC matrix 302a, $1^{st}$ harmonic 304a, etc.). SVD is performed on the harmonic matrices individually to obtain corresponding Fourier domain left singular vectors matrices (e.g., 302b, 304b, etc.), Fourier domain singular values matrices (e.g., 302c, 304c, etc.), and Fourier domain right singular vectors matrices (e.g., 302d, 304d, etc.). Inverse Fourier transform is then performed on the Fourier domain matrices in the reverse direction of the Fourier transform, resulting in native domain left singular vectors matrices (e.g., 302e, 304e, etc.) convolved with native domain singular values matrices (e.g., 302f, 304f, etc.) convolved with native domain right singular vectors matrices (e.g., 302g, 304g, etc.).

Figure 3B:
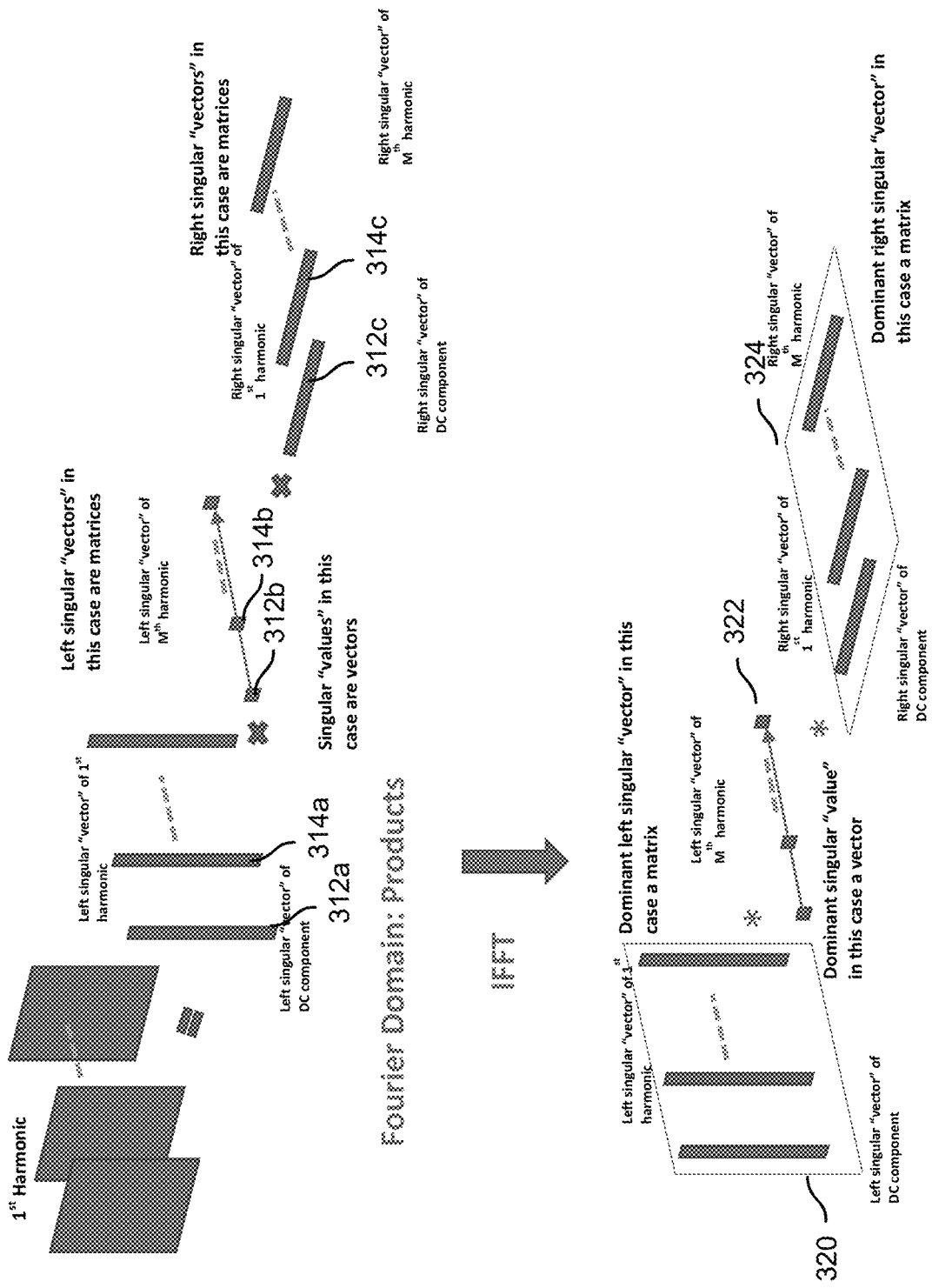
FIG. 3B is a diagram illustrating how to reduce the Fourier domain tensor to its dominant singular vector and value results.

FIG. 3B is a diagram illustrating how to reduce the Fourier domain tensor to its dominant singular vector and value results. In this case, the most dominant terms in each spectral component (in this case, each harmonics matrix) are obtained. The left most vectors in the left singular vectors matrices (e.g., 312a, 314a, etc.), the top singular value in the singular values matrices (e.g., 312b, 314b, etc.), and the top most vectors in the transpose of the right singular vectors matrices (e.g., 312c, 314c, etc.) are kept. Inverse Fourier transform is performed on the dominant terms, producing in the native domain the dual model where a dominant native domain left singular vector matrix (320) is convolved with a dominant native domain singular values vector (322) which is convolved with a dominant right singular vector matrix (324).

In this example, SVD is performed in matrix planes perpendicular to dimension 3 of the tensor. SVD performed with respect to a different dimension of the tensor will represent a different organization of energy or information and have different dominant factors.

A matrix A can be rewritten in its SVD expansion forms as follows:

$$A = \sigma_1 u_1 v'_1 + \sigma_2 u_2 v'_2 + \ldots + \sigma_N u_N v'_N$$

A can also be written in the Frobenius expansion form as:

$$A = \sigma_1 \mathbb{U}_1 + \sigma_2 \mathbb{U}_2 + \ldots + \sigma_N \mathbb{U}_N$$

In the Frobenius expansion, the Frobenius vector $\mathbb{U}_j = u_j v'_j$ is a rank-1 matrix that represents the j-th term in the Frobenius expansion of the matrix A.

Further, the following orthonormality condition holds:

$$u'_j v_k = \begin{cases} 1 & \text{if } j = k \\ 0 & \text{if } j \neq k \end{cases} \quad (4)$$

Thus, in the Frobenius sense, (that is, applying Frobenius product instead of standard vector product to examine the properties and relationships between matrices), the following are true:

$$\mathbb{U}_j \perp \mathbb{U}_k \text{ for } j \neq k$$

$$\mathbb{U}_j \perp_{\mathcal{F}} \mathbb{U}_k \text{ for } j \neq k$$

$$\mathbb{U}_j \#_{\mathcal{F}} \mathbb{U}_k \text{ for } j = k$$

where $\perp_{\mathcal{F}}$ indicates "Frobenius-orthogonal" and where $\#_{\mathcal{F}}$ indicates "Frobenius equal and parallel to" which actually means that $\mathbb{U}_j$ is normal in the Frobenius-sense for all j. Thus, for the Frobenius matrix product:

$$\sum_{n=1}^{N}\sum_{m=1}^{N}(\mathbb{U}_j \otimes \mathbb{U}_k) = \begin{cases} 0 \text{ for } j \neq k \\ 1 \text{ for } j = k \end{cases}$$

where $\otimes$ indicating element-by-element products of $\mathbb{U}_j$ and $\mathbb{U}_k$, and the summations are over rows and columns. The Frobenius matrix product is therefore obtained by multiplying the corresponding elements of two matrices and summing all the outputs (matrix equivalent of vector inner product). The following shorthand is used to express the Frobenius product of two matrices:

$$y = \mathbb{U}_j \times_{\mathcal{F}} \mathbb{U}_k$$

where the output y is a scalar.

Note that each Frobenius plane $\mathbb{U}_j$ is a rank-1 matrix, and when used in the SVD context, each $\mathbb{U}_j$ is an outer product of the singular vectors (that is, $\mathbb{U}_j = u_j v'_j$), which produces the Frobenius-orthonormal property.

Figure 4:
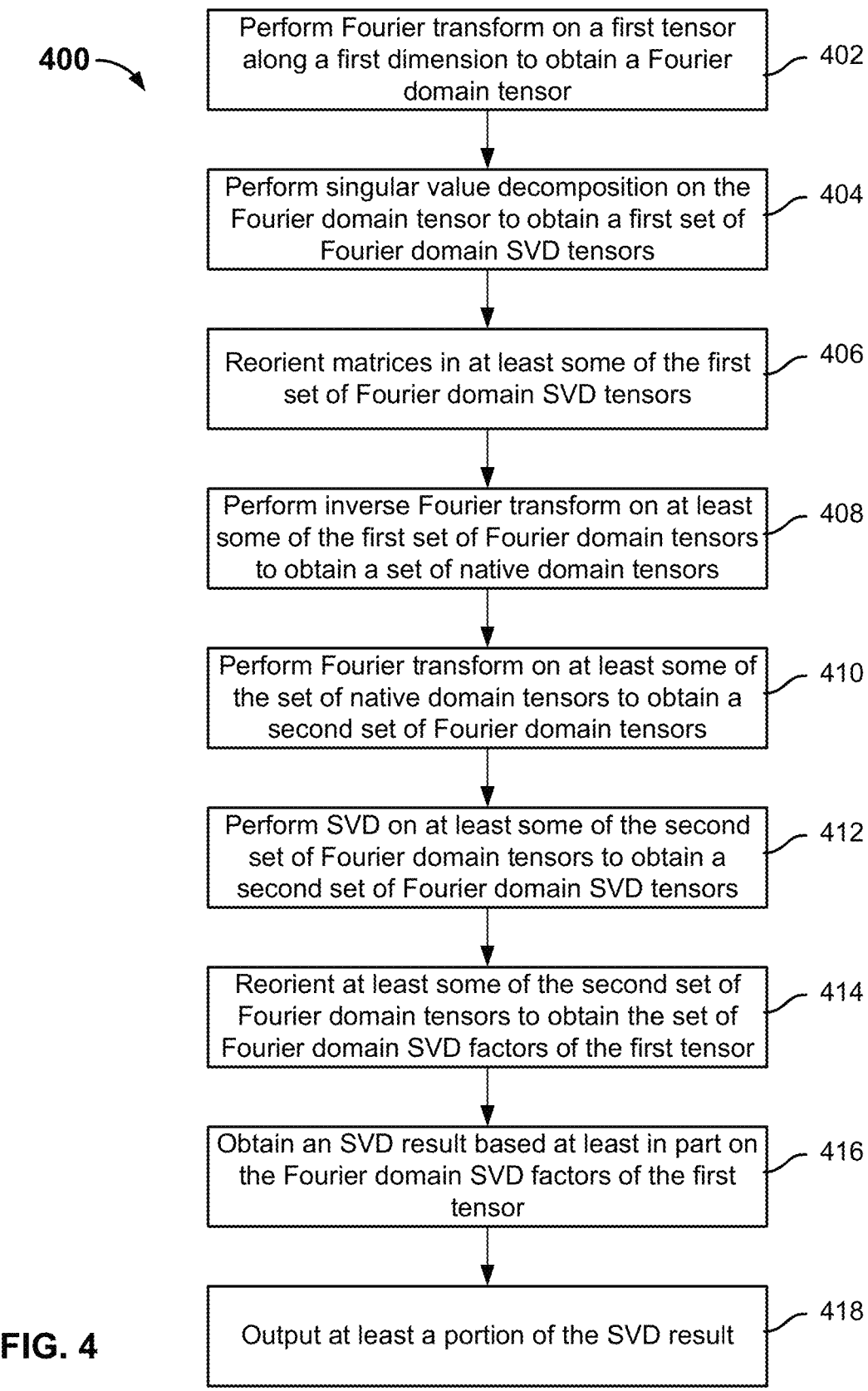
FIG. 4 is a flowchart illustrating an embodiment of a tensor decomposition process.

FIG. 4 is a flowchart illustrating an embodiment of a tensor decomposition process. Process 400 can be performed on a system such as 100, as well as on a system comprising an IC, an FPGA, a PAL, a GPU, and/or other appropriate hardware.

In this example, a first tensor in the native domain is processed.

In 402-414, a set of Fourier domain SVD factors of the first tensor is obtained. In this example, the first tensor is a 3-dimensional tensor. As will be explained in greater detail below, the Fourier domain SVD factors include tensors resulting from applying Fourier transform and SVD.

At 402, Fourier transform is performed on the first tensor along a first dimension to obtain a Fourier domain tensor. How to perform the Fourier transform is discussed above in connection with FIG. 2D. The matrices in the Fourier domain tensor represent the spectral components of the first tensor along the first dimension. Note that the first dimension can be any of the three dimensions of the tensor.

At 404, singular value decomposition (SVD) is performed on the Fourier domain tensor to obtain a first set of Fourier domain SVD tensors. How to perform the SVD is discussed above in connection with FIGS. 3A and 3B.

At 406, matrices in at least some of the first set of Fourier domain SVD tensors are reoriented. As will be explained in greater detail below, while the value and positions of the elements in the tensor are not changed, reorienting the matrices allows the singular vectors and singular values to be organized according to their order of dominance (in other words, how much a vector contributes in energy to the decomposition of the Fourier domain tensors).

At 408, inverse Fourier transform is performed on at least some of the reoriented first set of Fourier domain tensors to obtain a set of native domain tensors. The inverse Fourier transform is performed in the same dimension in the opposite direction as the Fourier transform.

At 410, Fourier transform is performed on at least some of the set of native domain tensors to obtain a second set of Fourier domain tensors.

At 412, SVD is performed on at least some of the second set of Fourier domain tensors to obtain a second set of Fourier domain SVD tensors.

At 414, matrices in at least some of the second set of Fourier domain SVD tensors are reoriented. The singular vectors and singular values are organized according to their order of dominance in the reoriented matrices. The values and positions of the tensor elements themselves are unchanged.

At this point the set of Fourier domain SVD factors of the first tensor are obtained. The Fourier domain SVD factors include Fourier domain tensors comprising the left singular vectors tensors, the right singular vectors tensors, and the singular values tensor.

At 416, an SVD result is obtained based at least in part on the set of Fourier domain SVD factors of the first tensor. In some embodiments, the SVD result is the SVD result of the first tensor. In some embodiments, the SVD result is the SVD result of a higher dimensional tensor which includes the first tensor. Both embodiments are described in greater detail below.

At 418, at least a portion of the SVD result is output. In some embodiments, the SVD result is fully output and used by a next stage (e.g., to be used in data analysis tools for clustering, classification, de-noising, etc., to be displayed to a user, to be stored, etc.). In some embodiments, the SVD result includes one or more dominant terms of the original tensor or the higher dimensional tensor, thus providing a compressed and de-noised representation of the original tensor or the higher dimensional tensor.

By performing analysis of the tensor in the Fourier domain, process 400 determines the components of the tensor data more accurately than existing techniques. The technique is highly efficient because it eliminates the convolution operation in the native domain. The technique is also faster than most known techniques because many of the operations such as Fourier transform, singular value decomposition, and inverse Fourier transform can be executed on multiple processors in parallel. Because the dominant terms of the tensor are obtained in decomposition, in some embodiments the process produces a compressed representation of the tensor which requires less memory and storage space.

In some embodiments, the SVD result is obtained for the first tensor. Thus, in 416, to obtain the SVD result based on the Fourier domain SVD factors of the first tensor includes performing an inverse Fourier transform on tensors in the reoriented second set of Fourier domain SVD tensors. A process for obtaining the SVD result for the first tensor is explained in connection with FIGS. 5A-5J.

Figure 5A:
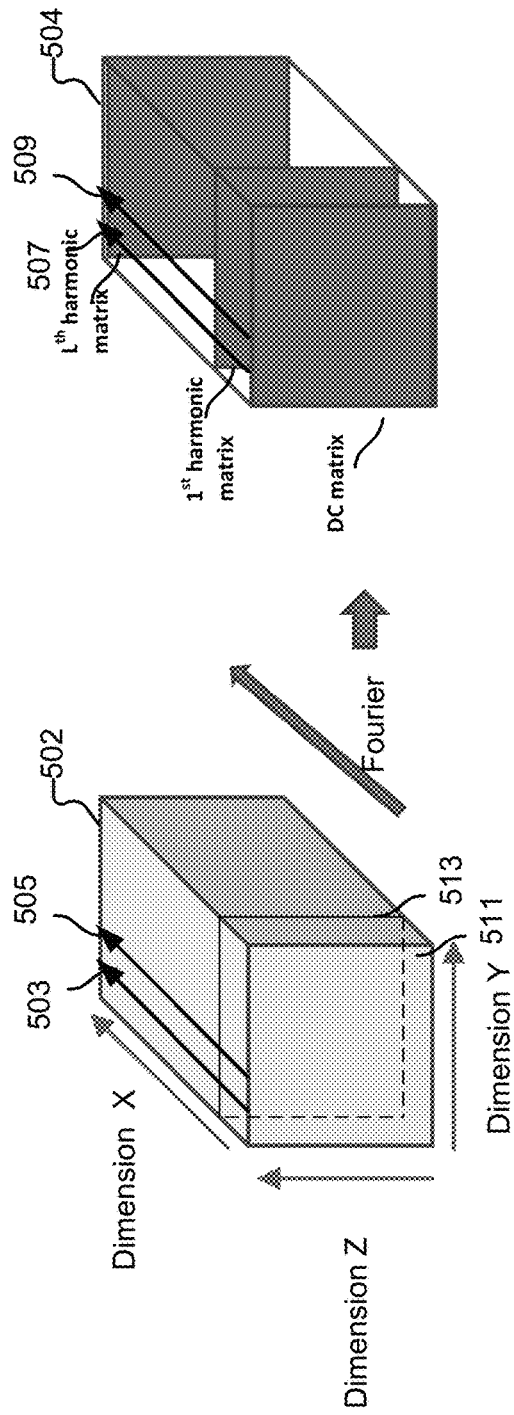

According to 402 of process 400 and as shown in FIG. 5A, Fourier transform is performed on original tensor 502 along a first dimension (in this case, arbitrarily chosen as dimension X) to obtain a transformed tensor 504 in the Fourier domain. The exact choice of the first dimension is not important, as all the dimensions will undergo transform at some point in the process and the final result will be the same.

As shown in FIG. 5A, tensor 502 is to be transformed. Along dimension X, the elements at the same locations of the matrices form respective vectors. For instance, all the elements located at (:, 1, 0) of the matrices in tensor 502 form vector 503, all the elements located at (:, 2, 0) of the matrices in tensor 502 form another vector 505, and so on. This way, a set of vectors is formed based on elements in the tensor. Fourier transforms are performed on the vectors individually to obtain transformed vectors in the Fourier domain (e.g., vectors 507, 509), which are the same size and extend in the same direction as the input vectors to the Fourier transform operation. The individual elements of the transformed vectors correspond to the DC component, the $1^{st}$ harmonic, the $2^{nd}$ harmonic, ..., and the L-th harmonic of the input vectors in the Fourier domain. Vector elements of a particular harmonic from all the vectors form a corresponding matrix of that harmonic. For example, the DC matrix is formed by taking the DC elements of vectors 507,

509, etc., the $1^{st}$ harmonic matrix is formed by taking the $1^{st}$ harmonic elements of vectors 507, 509, etc., and so on. Thus, Fourier domain tensor 504 includes a plurality of transformed matrices that correspond to various spectral components of original tensor 502 with respect to dimension X (e.g., DC component matrix, the $1^{st}$ harmonic matrix, . . . , the L-th harmonic matrix, etc.). Together, the matrices form a transformed tensor representing the spectral content of the native domain tensor. The DC component matrix, $1^{st}$ harmonic matrix, . . . , and the L-th harmonic matrix are shown in the Fourier domain transformed tensor 504.

Discrete Fourier Transform (DFT), Fast Fourier Transform (FFT), or other appropriate Fourier Transform techniques can be used. Examples of FFT techniques include Cooley-Tukey FFT, Prime-Factor FFT, and Rader's FFT. Example implementations include the FFT function in Matlab™, the FourierTransform function in Mathematica™, the FastFourierTransformer class in Apache Commons Math API, etc. In various embodiments, the Fourier Transform function is implemented in software using general purpose processors, in hardware using field programmable gate arrays (FPGAs), programmable array logic (PALs), application specific integrated circuits (ICs), and/or any appropriate software/hardware combination. Fourier transforms of the matrices can be performed substantially in parallel on a plurality of processing elements to decrease processing time.

Figure 5B:
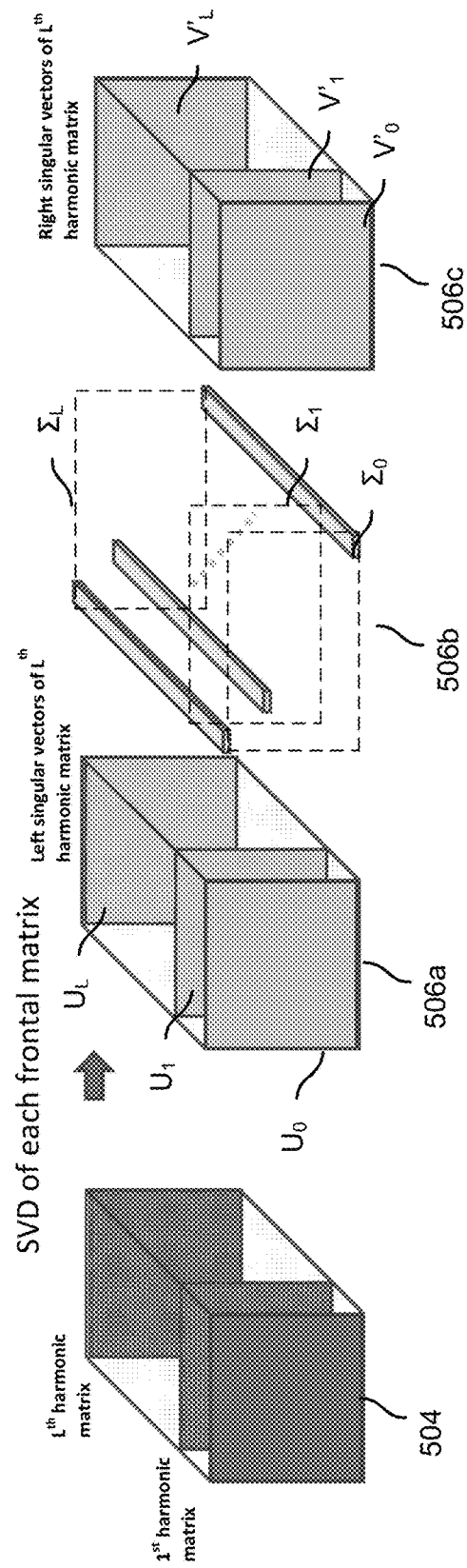

According to 404 of process 400 and as shown in FIG. 5B, SVD is performed on Fourier domain tensor 504 to obtain a first Fourier domain left singular vectors tensor 506a, a first Fourier domain singular values tensor 506b, and first Fourier domain right singular vectors tensor 506c. Specifically, SVD is performed on each harmonic matrix $A_j$ in Fourier domain tensor 504 to obtain a corresponding set of Fourier domain left singular vectors matrix $U_j$, Fourier domain singular values matrix $\Sigma_j$, and Fourier domain right singular vectors matrix $V'_j$. As shown, Fourier domain left singular vectors tensor 506a includes matrices $U_0, U_1, \ldots, U_L$; singular values tensor 506b includes matrices $\Sigma_0, \Sigma_1, \ldots, \Sigma_L$; and right singular vectors tensor 506c includes matrices $V'_0, V'_1, \ldots, V'_L$.

SVD of a matrix can be performed using a known technique such as Cholesky decomposition, an iterative decomposition technique developed by CyberAtomics, Inc., or any other appropriate techniques. The SVD function in Matlab™ and the SingularValueDecomposition in Mathematica™ are some example implementations. In various embodiments, the SVD function is implemented in software using general purpose processors, in hardware using FPGAs, PALs, integrated circuits (ICs), and/or any appropriate software/hardware combination. SVD of the matrices can be performed substantially in parallel on a plurality of processing elements to decrease processing time.

FIG. 5C illustrates the same set of transformed tensors as FIG. 5B, with singular vectors and corresponding singular values grouped according to their dominance (e.g., energy content). As shown, left singular vectors 512, 514, etc., singular value vector 522, and right singular vectors 532, 534, etc. are the most dominant factors; left singular vectors 516, 518, etc., singular values 526, and right singular vectors 536, 538, etc. are the second most dominant factors, and so on.

According to 406 and as shown in FIG. 5D, the matrices in the Fourier domain SVD tensors are reoriented. The tensors in FIG. 5D are the same as FIG. 5C without changes to the values, except that the matrices in the tensors shown are reoriented according to their dominance. Thus, tensor 506 can be viewed as being formed by matrices aligned in the lateral direction, where matrix 552 is formed by the most dominant left singular vectors, matrix 554 is formed by the second most dominant left singular vectors, etc. Tensor 508 can be viewed as being formed by matrices aligned in the horizontal direction, where matrix 562 is formed by the most dominant right singular vectors, matrix 564 is formed by the second most dominant right singular vectors, etc. In this view, the corresponding lateral left and horizontal right singular vectors that contribute to the decomposition of the 3-dimensional spectral tensor are shown in groups. For example, 552, 556, and 562 form the most dominant group; 554, 558, and 564 form the second most dominant group, etc. The lateral left singular planes are mutually Frobenius-orthogonal, and the horizontal right singular planes are mutually Frobenius-orthogonal. In some embodiments, to represent the original matrix in a compressed form, the decomposed tensors are compressed by keeping the most dominant group(s) while removing the rest. This representation also has the effect of removing noise which tends to be present in the non-dominant group(s). In some embodiments, the compression is done at a later stage.

According to 408 of process 400, inverse Fourier transform is performed on the Fourier domain SVD tensors to obtain a set of native domain tensors. As shown in FIG. 5D, the inverse Fourier transform is performed along the first dimension but in the opposite direction as the Fourier transform, on the first Fourier domain left singular vectors tensor, the first Fourier domain singular values tensor, and the first Fourier domain right singular vectors tensor. FIG. 5E illustrates the inverse transformed tensors in the native domain.

Similar to the Fourier transform but in the opposite direction, the inverse Fourier transforms are performed on individual vectors in the Fourier domain tensors along the first dimension to obtain a set of inverse transformed vectors that together form a set of native domain tensors. In particular, inverse Fourier transform is performed on Fourier domain left singular vectors tensor 506 to obtain a native domain left singular vectors tensor 556, on Fourier domain right singular vectors tensor 508 to obtain a native domain right singular vectors tensor 558, and on Fourier domain singular values tensor 510 to obtain a native domain singular values tensor 560.

Inverse Discrete Fourier Transform (IDFT), Inverse Fast Fourier Transform (IFFT), or other appropriate inverse Fourier transform techniques can be applied. Example implementations include the IFFT function in Matlab™, the InverseFourierTransform function in Mathematica™, etc. In various embodiments, the inverse Fourier transform function is implemented in software using general purpose processors, in hardware using FPGAs, PALs, and/or ICs, and/or any appropriate software/hardware combination. Inverse Fourier transforms of the matrices can be performed substantially in parallel on a plurality of processing elements to decrease processing time.

Previously, in the Fourier domain (FIGS. 5C and 5D), the tensors are multiplied. Because multiplication in the Fourier domain corresponds to convolution in the native domain, in FIG. 5E, the tensors are convolved.

According to 410 of process 400 and as shown in FIG. 5F, Fourier transform is performed on the native domain left and right tensors to obtain a second set of Fourier domain tensors. In particular, Fourier transform is performed on native domain left singular vectors tensor 556 along the second dimension (dimension Y) to obtain a Fourier domain left singular vectors tensor 576, and on the native domain right singular vectors tensor 558 along the third dimension (dimension Z) to obtain a Fourier domain right singular vectors tensor 578. Fourier transform is not required for the native domain singular values tensor.

Figure 5G:
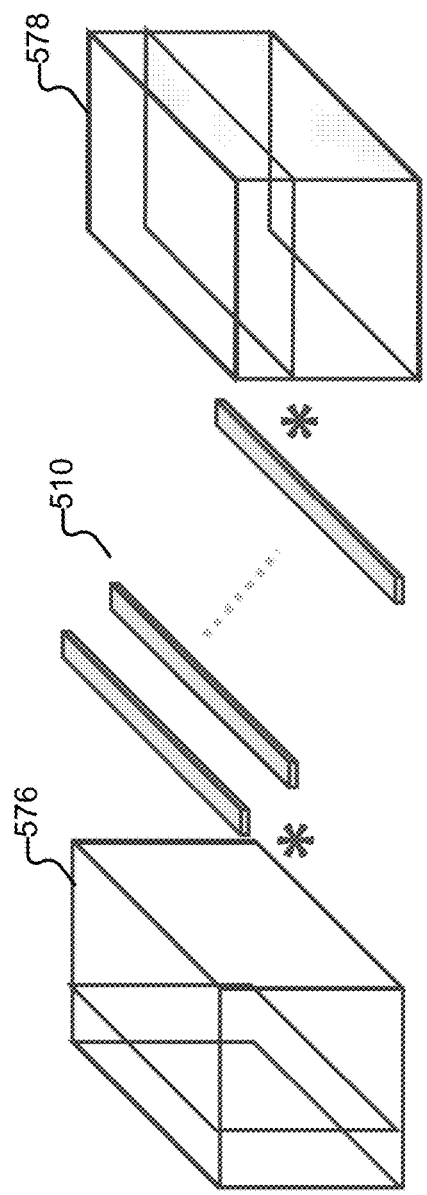

FIG. 5G illustrates the resulting Fourier domain left singular vectors tensor 576 and the resulting Fourier domain right singular vectors tensor 578. Since the native domain singular values tensor 510 is unchanged, the operations between tensors are still convolution. At this point the process has taken Fourier transform along all three dimensions. The reason for the Fourier transform on the left singular vectors tensor to be along dimension Y is that each of the Frobenius-orthogonal lateral planes have a dimension X and dimension Z outer product, but in the direction of dimension Y they are independent (orthogonal), and the Fourier transform characterizes the spectral behavior of the X-Z dimensions along independent dimension Y. Similarly, for the right singular vectors tensor, where dimensions X-Y relationships characterize each of the horizontal matrices, and the relationships along dimension Z (vertical) are independent, and therefore the spectral behavior of relationships of the X-Y dimensions along dimension Z is extracted through this Fourier transform.

Figure 5H:
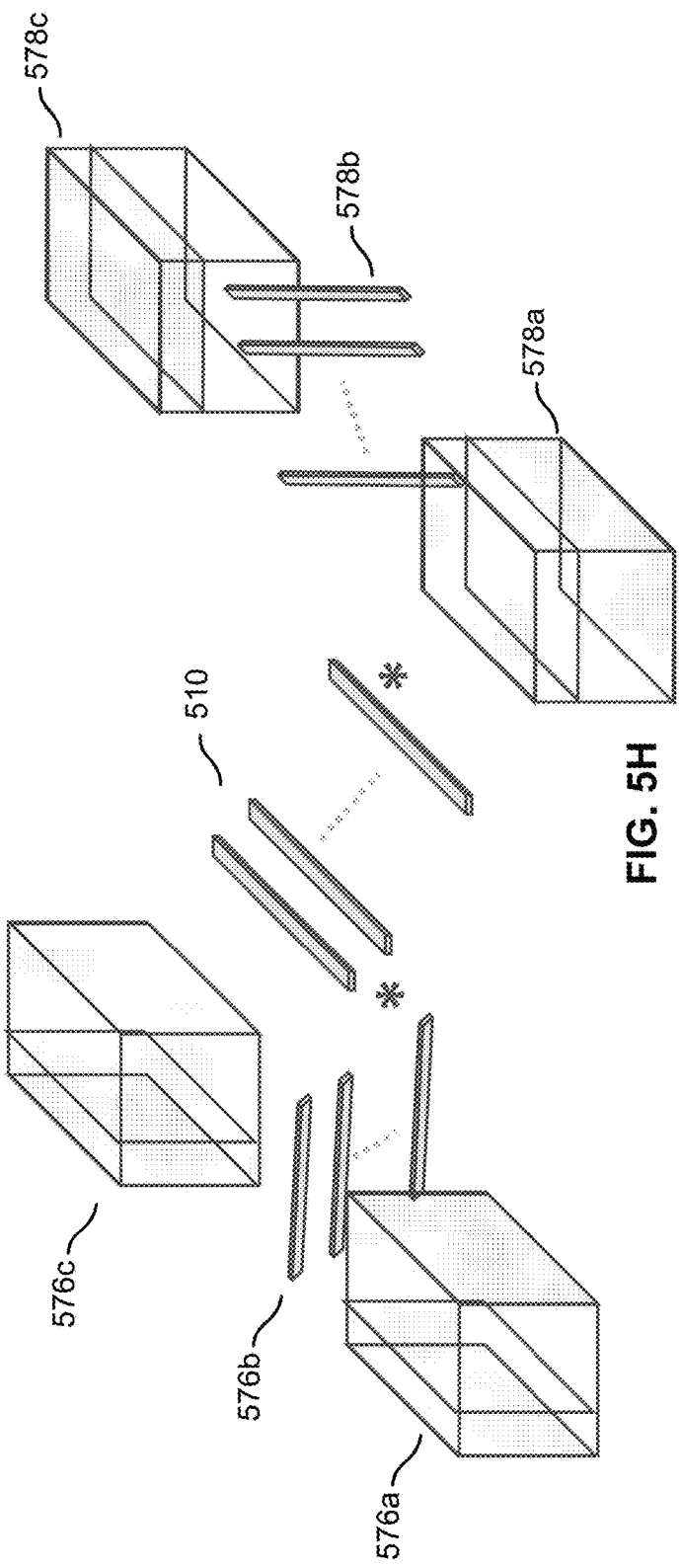

According to 412 of process 400, SVD is performed on the lateral plane matrices in the second Fourier domain left singular vectors tensor 576 (since these spectral planes are independent of each other), and on the horizontal plane matrices in the second Fourier domain right singular vectors tensor 578 (also since these spectral planes are also independent of each other). FIG. 5H illustrates the result of the SVD. Second Fourier domain singular vectors tensor 576 is decomposed into Fourier domain left-left singular vectors tensor 576a, Fourier domain left singular values tensor 576b, and Fourier domain left-right singular vectors tensor 576c. Right singular vectors tensor 578 is decomposed into Fourier domain right-left singular vectors tensor 578a, Fourier domain right singular values tensor 578b, and Fourier domain right-right singular vectors tensor 578c.

Figure 5I:
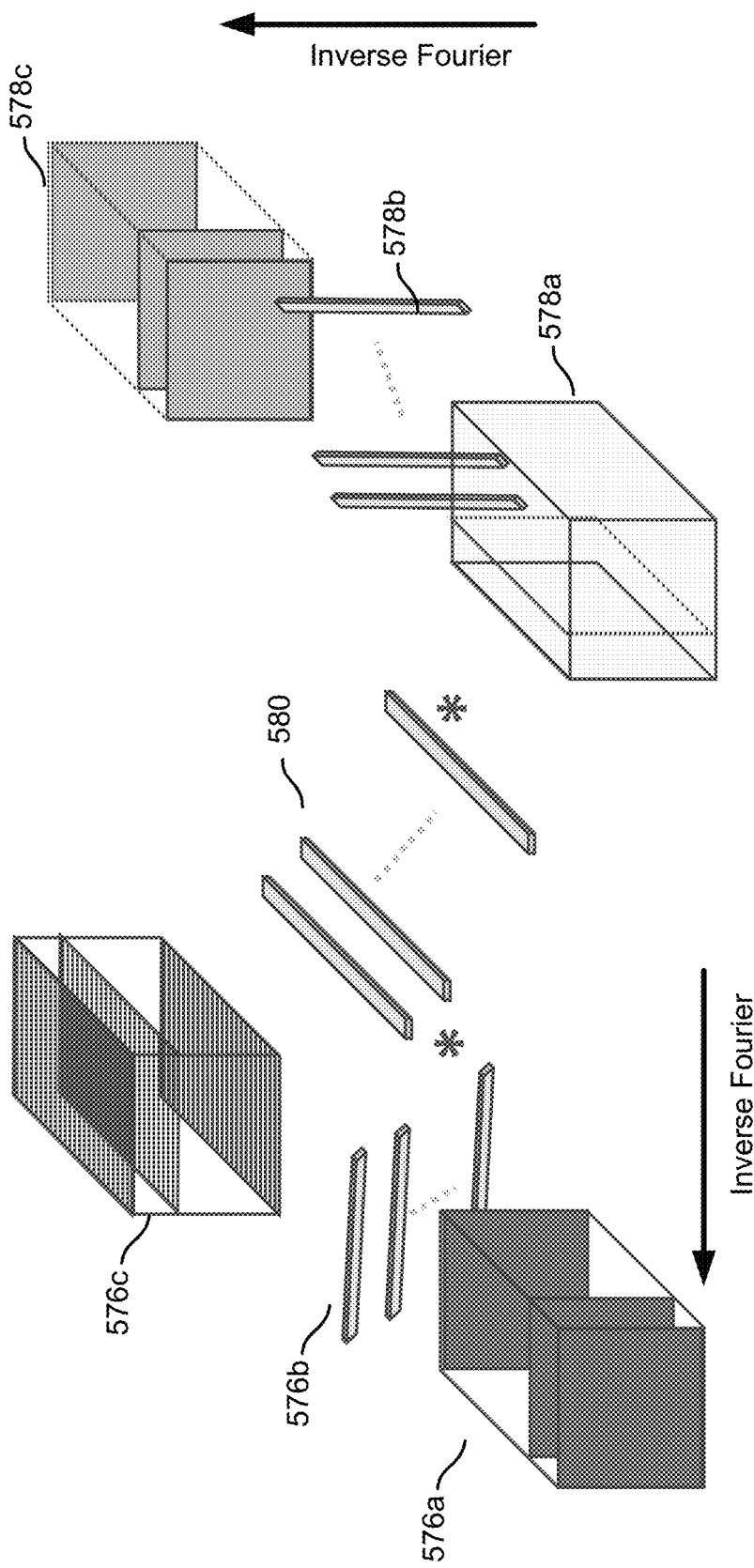

According to 414 of process 400, the matrices in tensors 576a, 576c, 578a, and 578c are reoriented according to the dominance of the singular vectors. This reorientation is similar to what was done to the tensors in FIG. 5D. FIG. 5I shows the reoriented tensors. Note that the elements of the matrices or their positions have not changed and the tensors themselves remain the same. Reorienting the matrices groups the most significant singular vectors from each tensor in the same matrix, the second most significant singular vectors from each tensor in another matrix, and so on. The reoriented Fourier domain left-left singular vectors tensor 576a, Fourier domain left singular values tensor 576b, reoriented Fourier domain left-right singular vectors tensor 576c, reoriented Fourier domain right-left singular vectors tensor 578a, Fourier domain right singular values tensor 578b, reoriented Fourier domain right-right singular vectors tensor 578c, and Fourier domain singular values tensor 580 are included in the Fourier domain SVD factors.

Figure 5J:
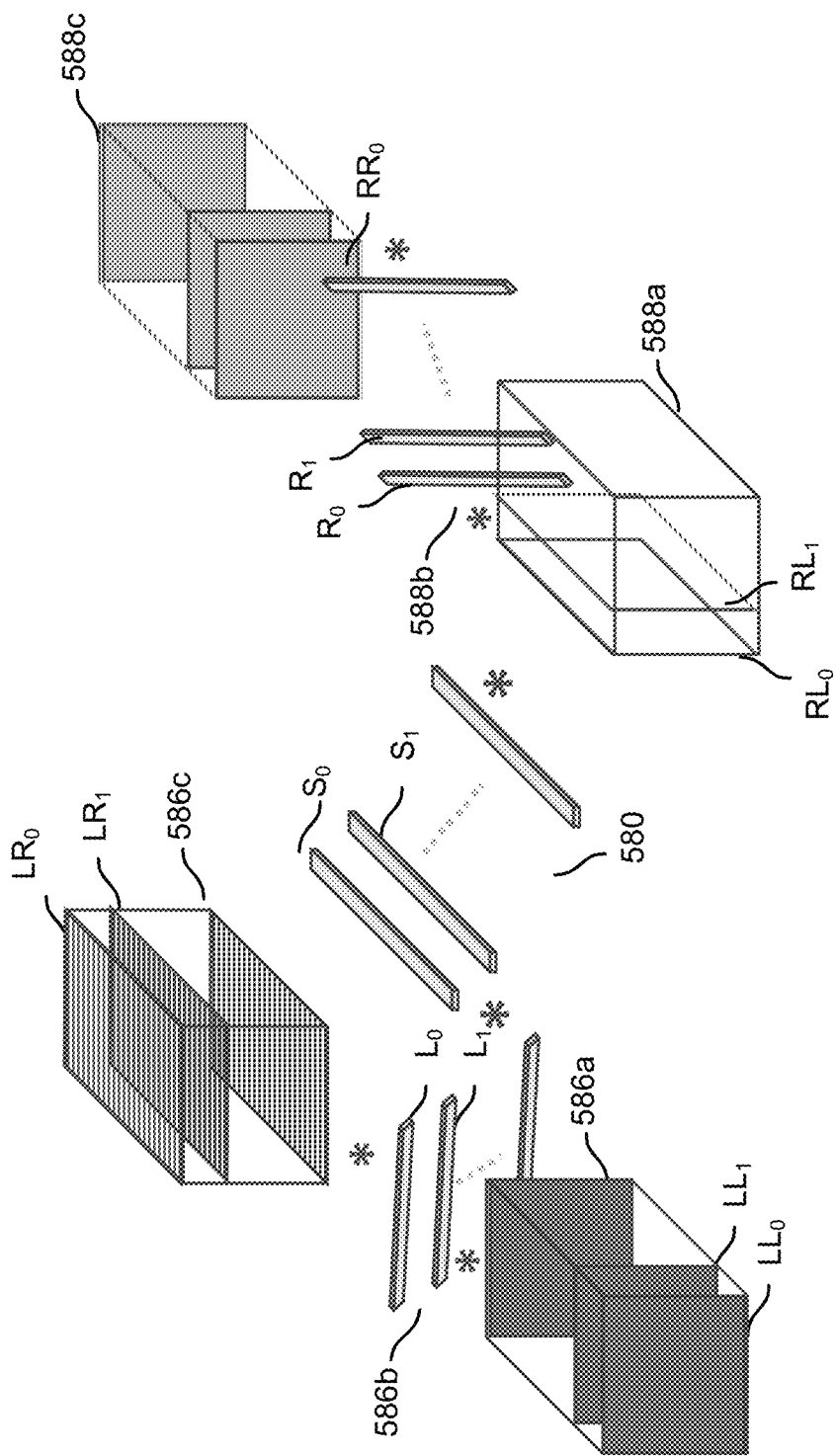

According to 416 of process 400, the SVD result is obtained based at least in part on the Fourier domain SVD factors. Specifically, inverse Fourier transform is performed on the Fourier domain SVD factors. As shown in FIGS. 5I and 5J, inverse Fourier transform is performed on the left side Fourier domain tensors in the reverse direction in dimension Y to obtain native domain left-left singular vectors tensor 586a, native domain left singular values tensor 586b, and native domain left-right singular vectors tensor 586c. Inverse Fourier transform is also performed on right side Fourier domain tensors in the reverse direction in dimension Z to obtain native domain right-left singular vectors tensor 588a, native domain right singular values tensor 588b, and native domain right-right singular vectors tensor 588c. The multiplication operations of the matrices in the Fourier domain are replaced with convolution operations in the native domain.

In FIG. 5J, on the left side, the matrices are reoriented such that the left-left singular vectors tensor 586a is shown with matrices oriented in the y-z plane and the left-right singular vectors tensor 586c is shown with matrices in the x-y plane. The matrix planes on tensors 586a and 586c are Frobenius-orthogonal. On the right side, the matrices are also reoriented such that the right-left singular vectors tensor 588a is shown with the matrices in the x-z plane and the right-right singular vectors tensor 588c is shown with matrices in the y-z plane. The matrix planes on tensors 588a and 588c are Frobenius-orthogonal.

The resulting reoriented matrices form the SVD decomposition result of the native domain tensor organized according to their order of dominance. In particular, matrices $LL_0$ of tensor 586a, $L_0$ of tensor 586b, $LR_0$ of tensor 586c, $S_0$ of tensor 580, $RL_0$ of tensor 588a, $R_0$ of tensor 588b, and $RL_0$ of tensor 588c are convolved to form the set of most significant SVD components as follows:

$$C_0 = (LL_0 * L_0 * LR_0) * S_0 * (RL_0 * R_0 * RR_0)$$

Similarly, matrices $LL_1$ of tensor 586a, $L_1$ of tensor 586b, $LR_1$ of tensor 586c, $S_1$ of tensor 580, $RL_1$ of tensor 588a, $R_1$ of tensor 588b, and $RR_1$ of tensor 578c are convolved to form the set of second most significant SVD components, etc. Generally, the j-th most significant set of components is determined as:

$$C_j = (LL_j * L_j * LR_j) * S_j * (RL_j * R_j * RR_j)$$

Figure 5K:
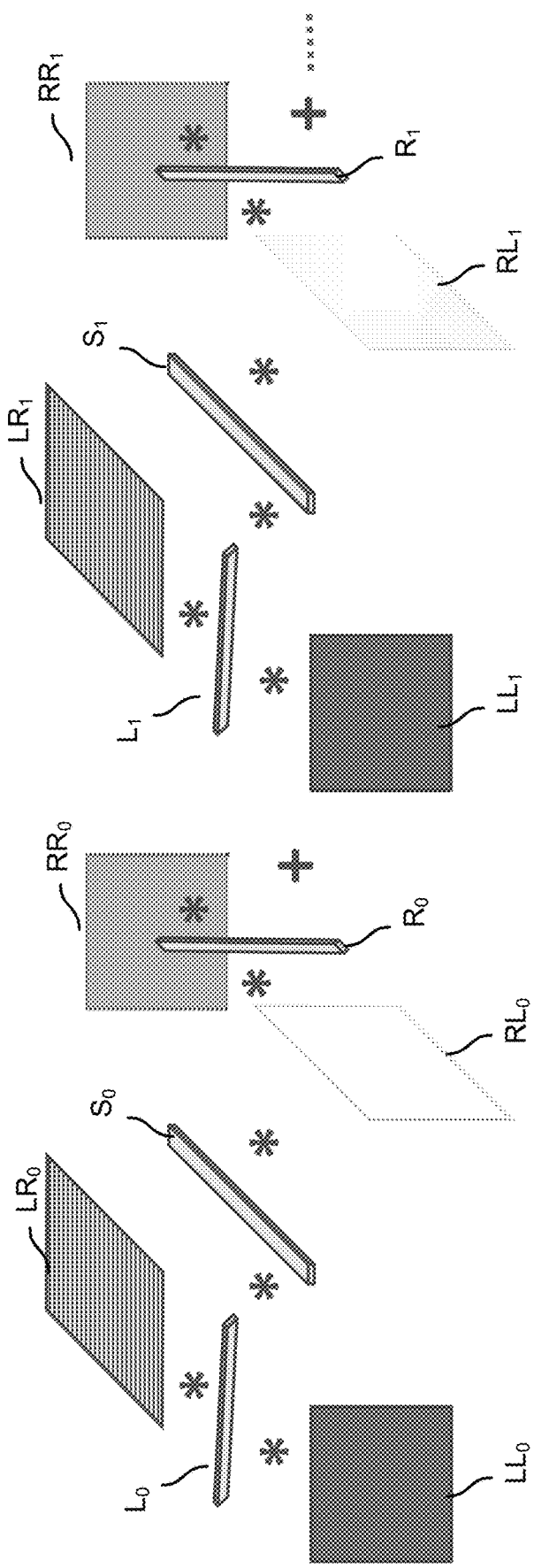

FIG. 5K illustrates the first two most significant sets of components.

According to 418 of process 400, at least a portion of the singular value decomposition result is output. The original tensor can be represented as $$\sum_0^L C_j.$$

In some embodiments, the SVD result is outputted in its entirety to be processed further by other applications such as analytics applications, filtering applications, de-noising applications, compression, clustering, or the like. In some embodiments, the first k components (e.g., $C_0, \ldots, C_k$) of the SVD result are output as a compressed/de-noised representation of the native domain tensor. The SVD result or portions thereof can also be displayed or stored.

Figure 6:
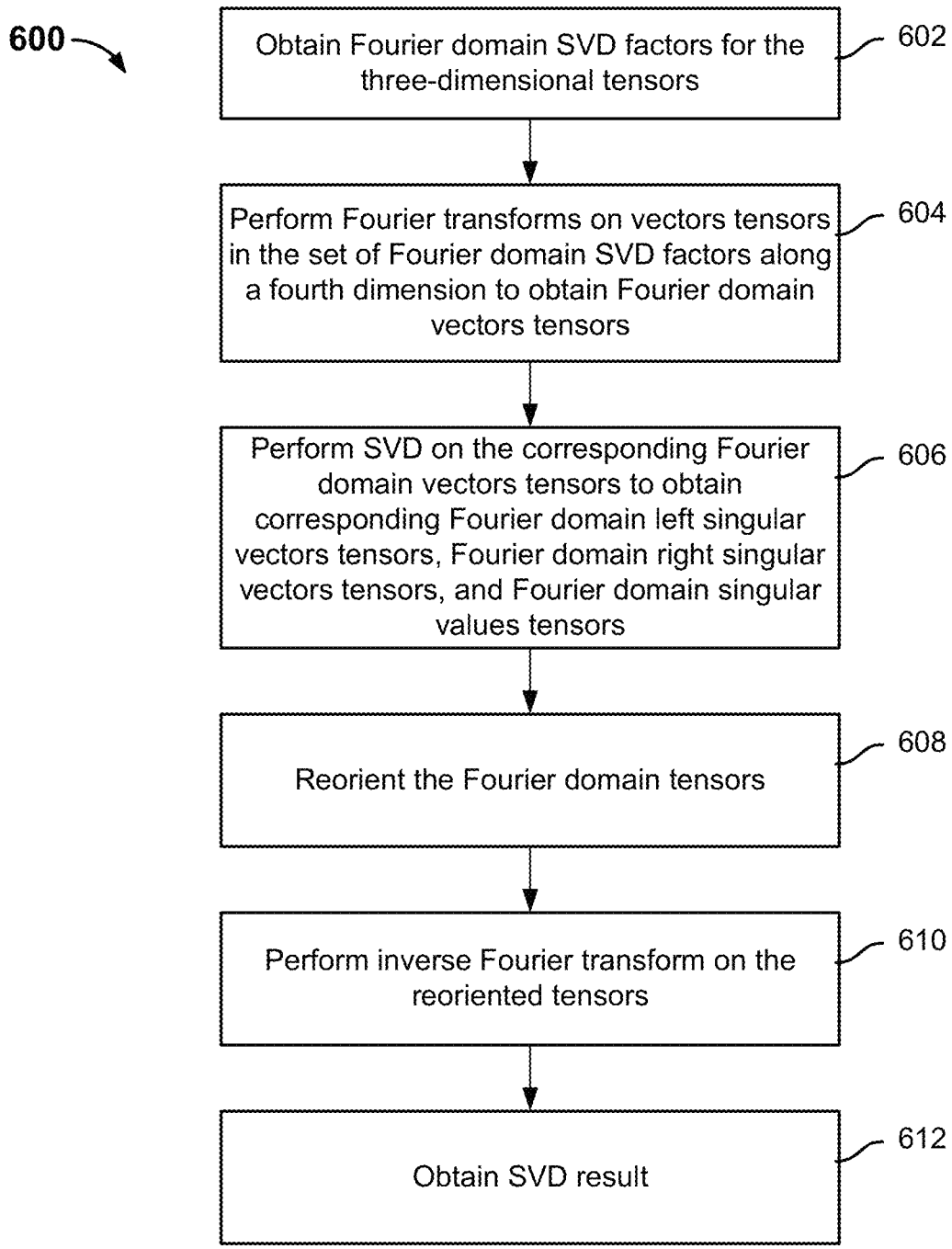
FIG. 6 is a flowchart illustrating an embodiment of a process for performing SVD on a higher dimensional tensor of four or more dimensions.

The above example illustrates how to obtain SVD for a 3-dimensional tensor. The process can be expanded to obtain SVD for a tensor that is four-dimensional or higher. FIGS. 6 and 7A-7G illustrate how to perform SVD for a higher dimensional tensor. FIG. 6 is a flowchart illustrating an embodiment of a process for performing SVD on a higher dimensional tensor of four or more dimensions. FIGS. 7A-7G are diagrams illustrating an example in which SVD is obtained for a four dimensional tensor.

Process 600 can be performed on a system such as 100.

At 602 of process 600, Fourier domain SVD factors are obtained for 3-dimensional tensors included in the higher dimensional tensor. 402-414 of process 400 are used to obtain the Fourier domain SVD factors for the 3-dimensional tensors.

Figure 7A:
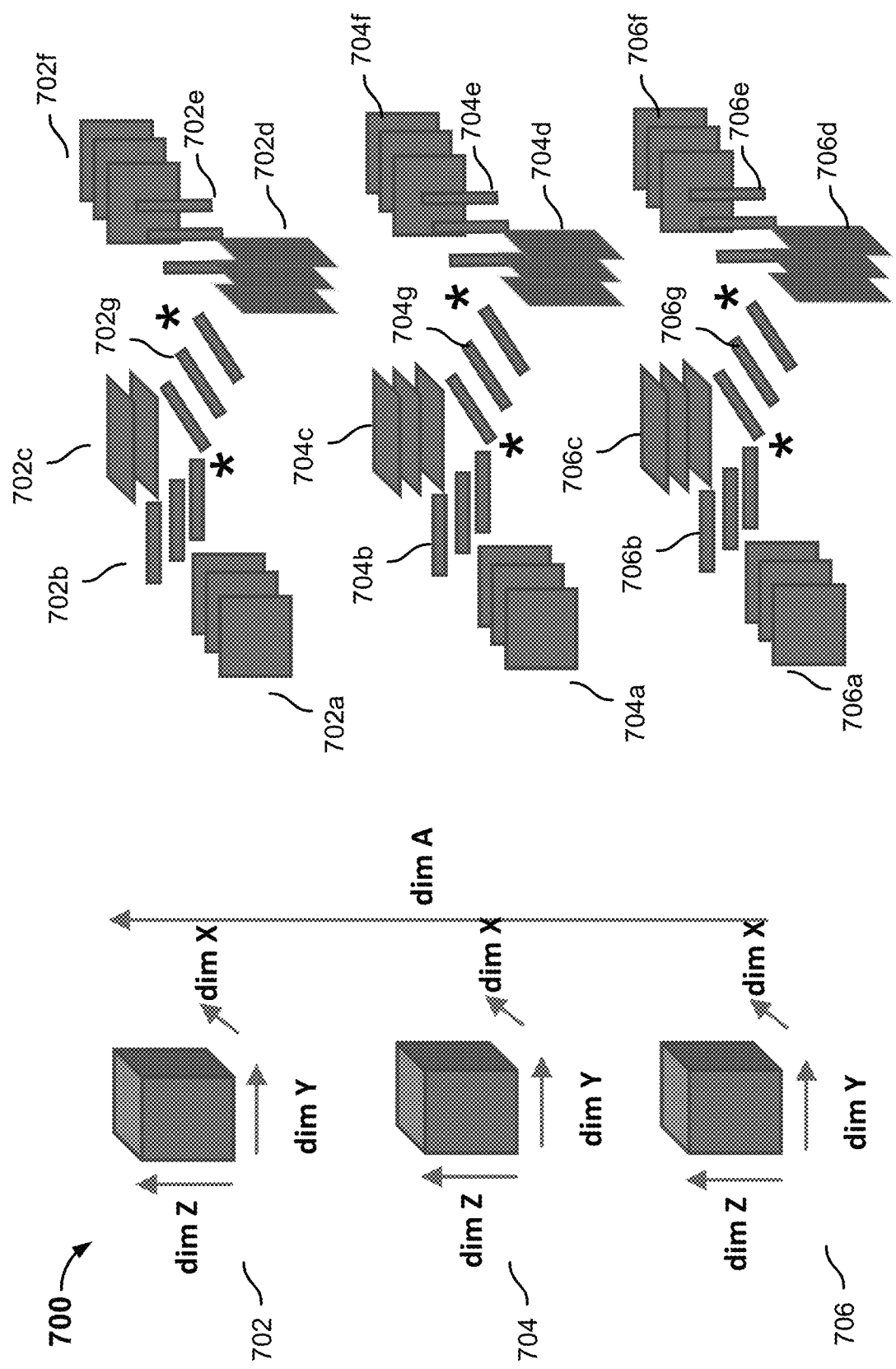
FIG. 7A illustrates a four dimensional tensor.

As shown in FIG. 7A, a four dimensional tensor 700 includes three dimensional tensors 702, 704, and 706 arranged along dimension A. Three sets of Fourier domain SVD factors are obtained for each tensor using 402-414 of process 400. For example, for tensor 702, the Fourier domain SVD factors include reoriented Fourier domain left-left singular vectors tensor 702a, reoriented Fourier domain left singular values tensor 702b, reoriented Fourier domain left-right singular vectors tensor 702c, reoriented Fourier domain right-left singular vectors tensor 702d, reoriented Fourier domain right singular values tensor 702e, and Fourier domain right-right singular vectors tensor 702f. Other Fourier domain SVD factors can be obtained similarly for tensors 704 and 706.

Figure 7B:
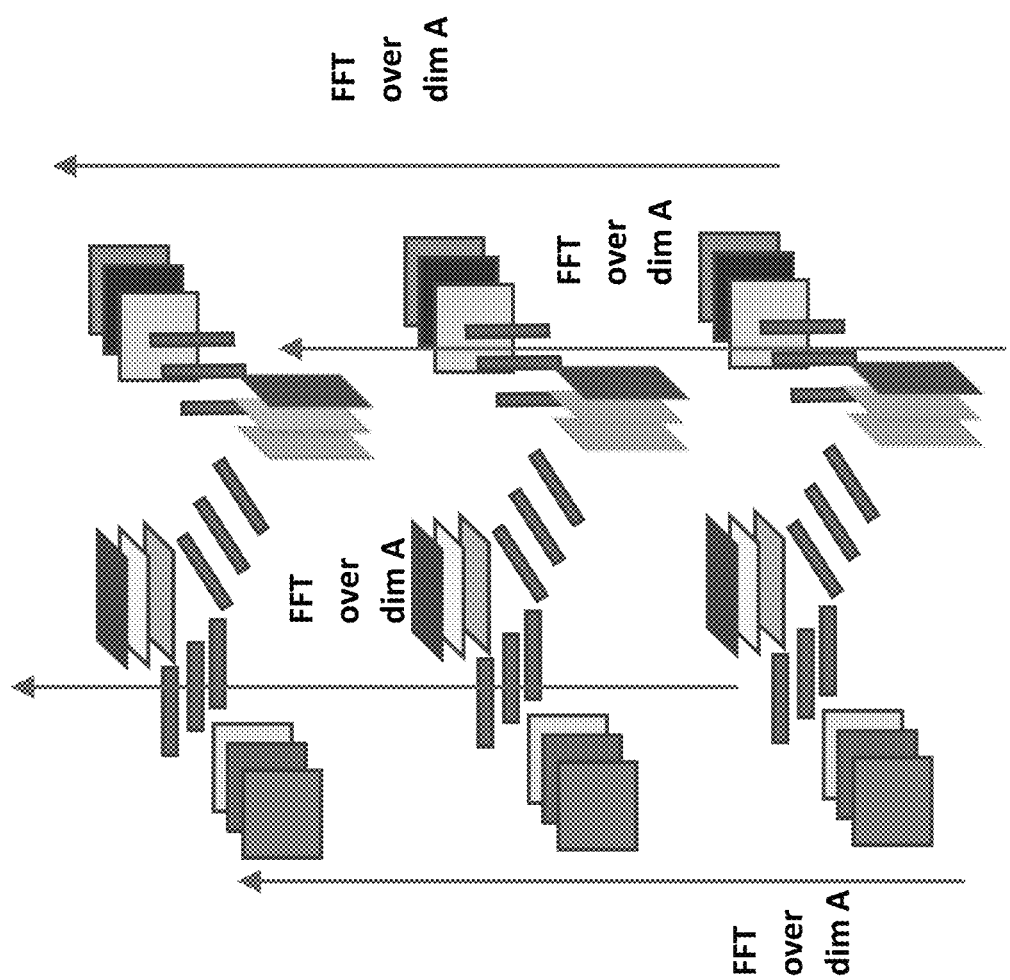
FIG. 7B illustrates the direction in which the Fourier transform takes place.

At 604 of process 600, Fourier transform is performed on the SVD factors in the fourth dimension (dimension A in this example) to obtain corresponding Fourier domain vectors tensors. FIG. 7B illustrates the direction in which the Fourier transform takes place. Fourier transform is performed on vectors within the SVD tensors, and the results are Fourier domain tensors comprising Fourier domain matrices.

At 606 of process 600, SVD is performed for the matrices in the Fourier domain vectors tensors. At 608, the SVD results are reoriented.

Figure 7C:
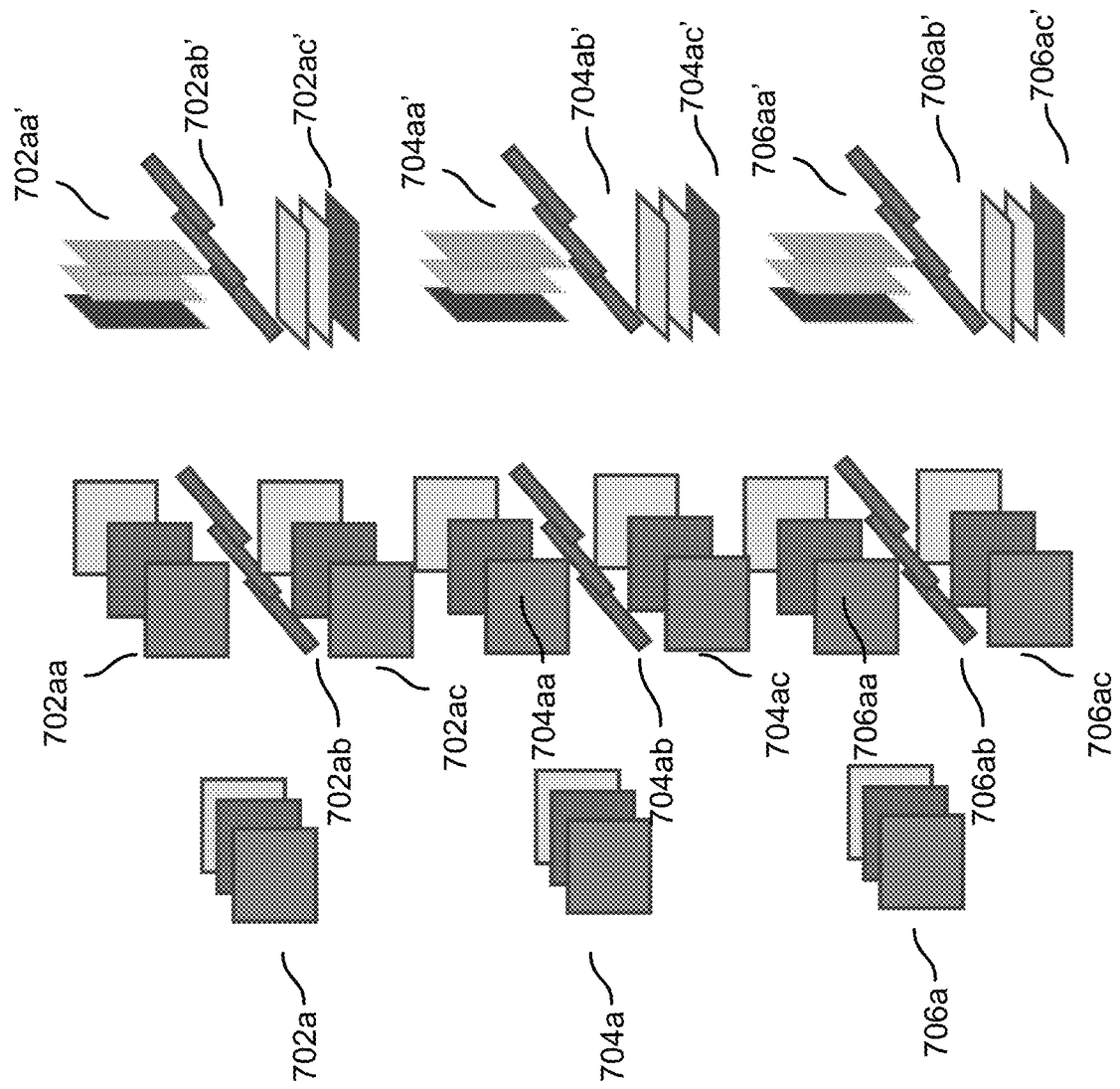

FIG. 7C illustrates the left-left singular vectors tensors 702a, 704a, and 706a. SVD is performed on matrices in the singular vectors tensors to obtain the corresponding left singular vectors tensors 702aa, 704aa, and 706aa, singular values tensors 702ab, 704ab, and 706ab, and the right singular values tensors 702ac, 704ac, and 706ac. The reoriented tensors are shown to the right (702aa', 702ab', and 702ac', etc.)

Figure 7D:
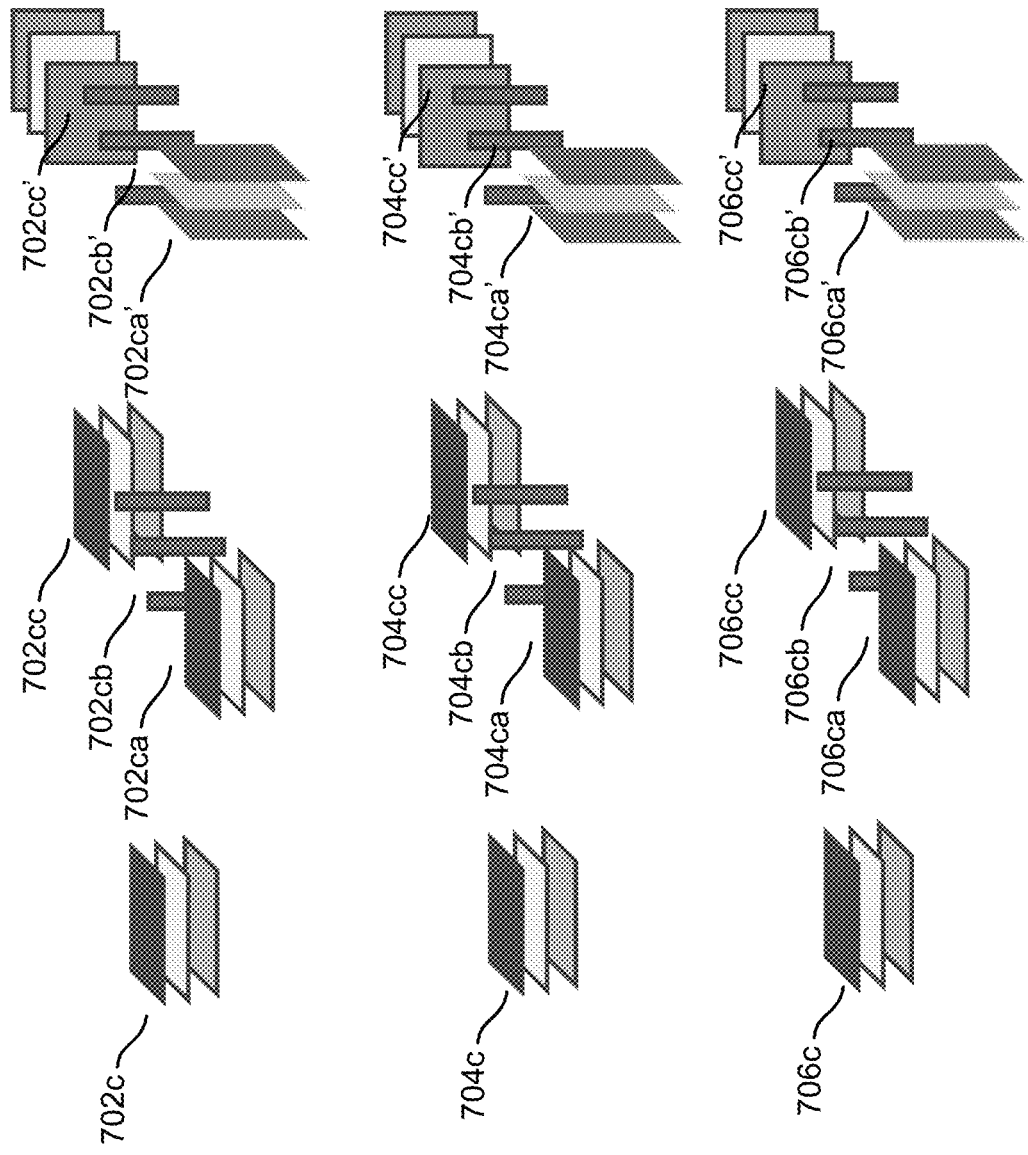
FIG. 7D illustrates the left-right singular vectors tensors 702c, 704c, and 706c.

FIG. 7D illustrates the left-right singular vectors tensors 702c, 704c, and 706c. It also illustrates the corresponding SVD results (e.g., 702ca-706cc), and the reoriented SVD tensors (e.g., 702ca'-706cc'.).

Figure 7E:
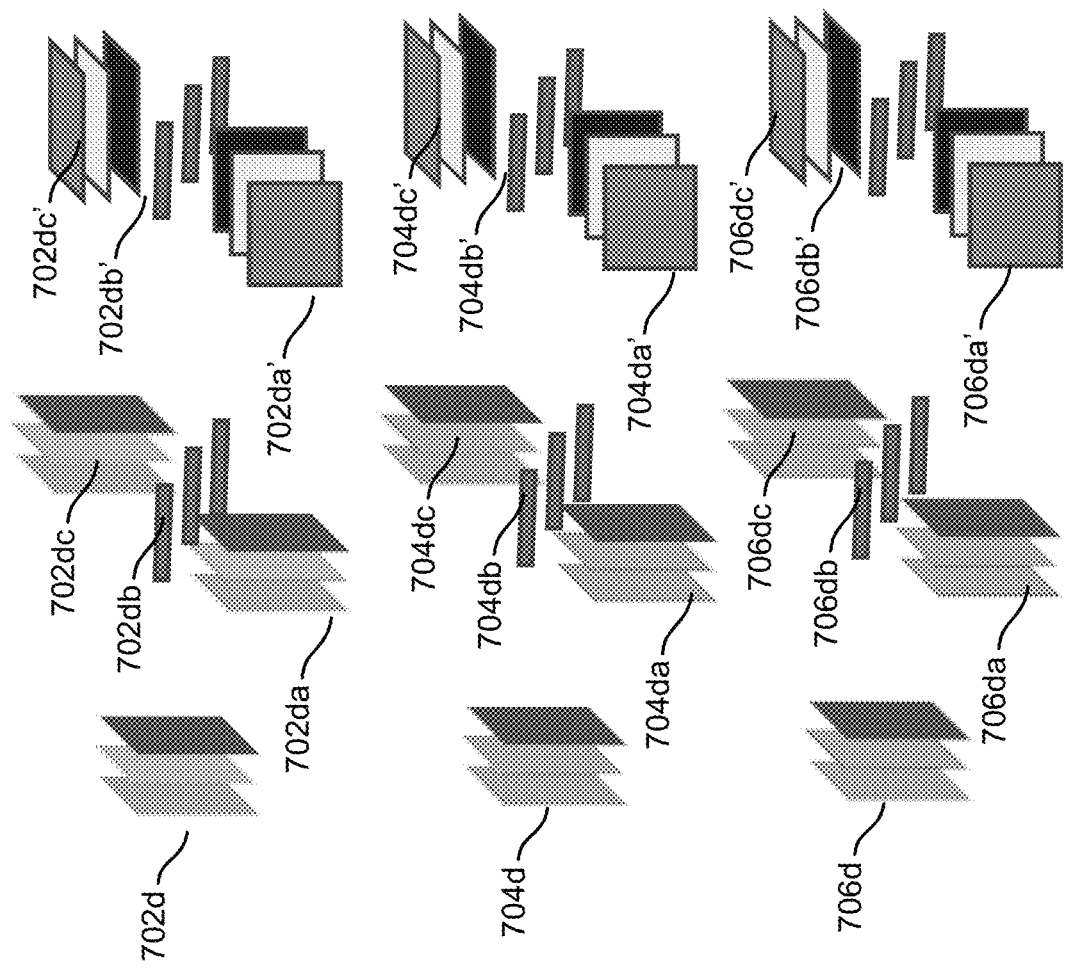
FIG. 7E illustrates the right-left singular vectors tensors 702d, 704d, and 706d, the corresponding SVD results, and the reoriented SVD tensors.

FIG. 7E illustrates the right-left singular vectors tensors 702d, 704d, and 706d, the corresponding SVD results (e.g., 702da-706dc), and the reoriented SVD tensors (e.g., 702da'-706dc').

Figure 7F:
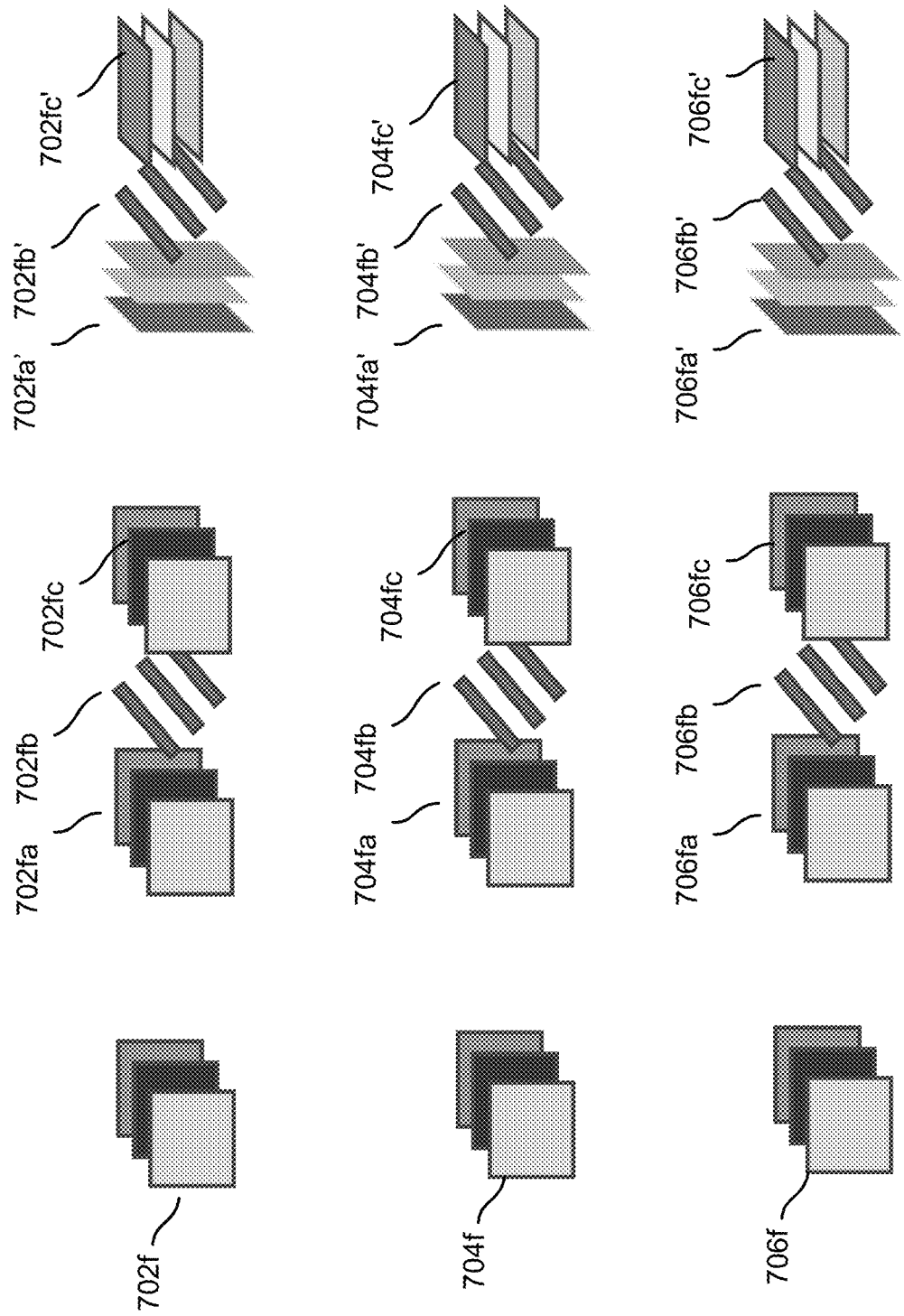
FIG. 7F illustrates the right-right singular vectors tensors 702f, 704f, and 706f, the corresponding SVD results, and the reoriented SVD tensors.

FIG. 7F illustrates the right-right singular vectors tensors 702f, 704f, and 706f, the corresponding SVD results (e.g., 702fa-706fc), and the reoriented SVD tensors (702fa'-706fc').

Figure 7G:
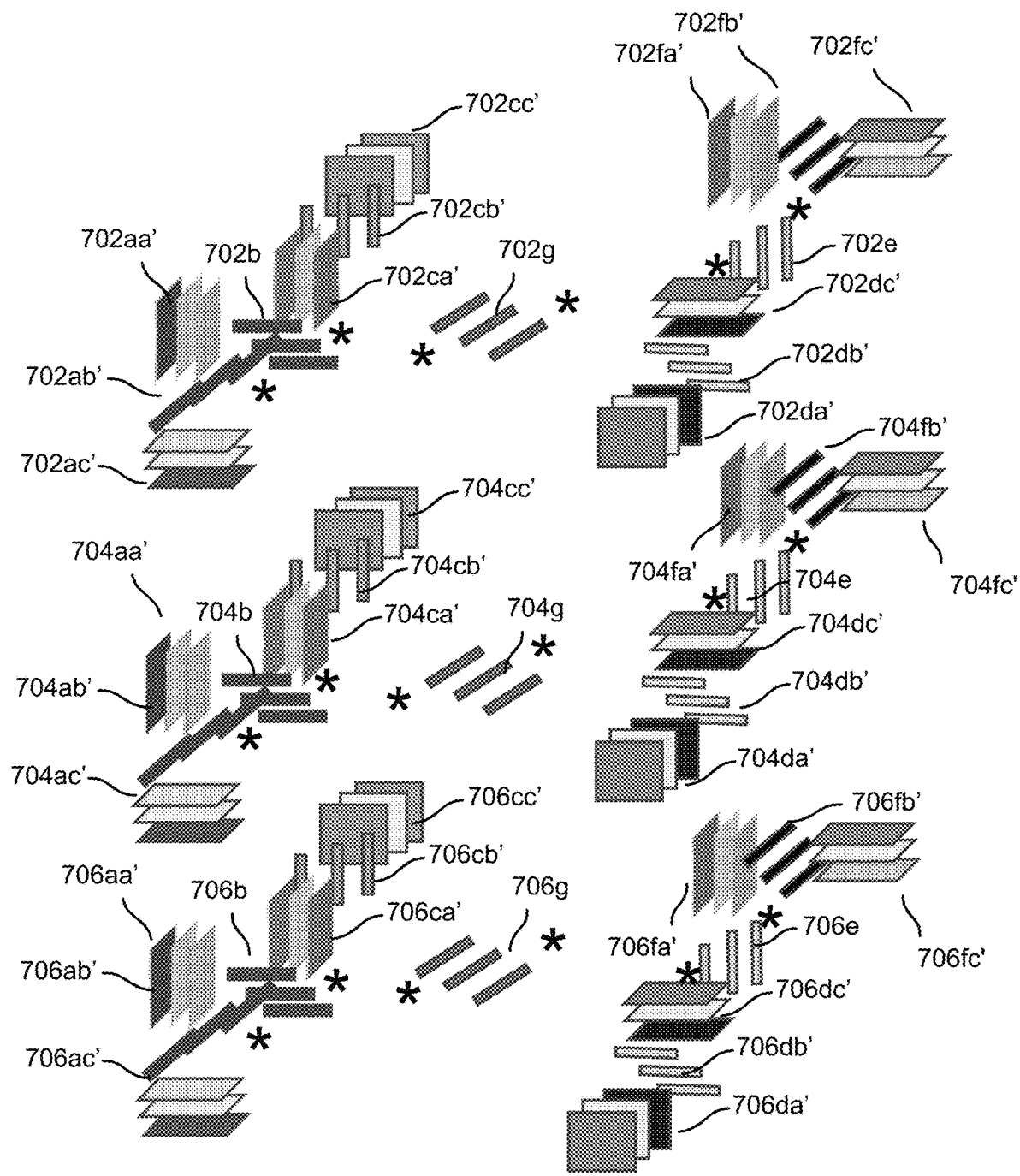
FIG. 7G illustrates all the reoriented SVD tensors combined together.

FIG. 7G illustrates all the reoriented SVD tensors combined together.

At 610, inverse Fourier transform is performed on the reoriented tensors. Specifically, inverse Fourier transform is performed on: the reoriented Fourier domain left singular vectors tensors (702aa'-706aa', 702ca'-706ca', 702da'-706da', and 702fa'-706fa') to obtain native domain left singular vectors tensors; the reoriented Fourier domain right singular vectors tensors (702ac'-706ac', 702cc'-706cc', 702dc'-706dc', and 702fc'-706fc') to obtain native domain right singular vectors tensors, and the Fourier domain singular values tensors (702-706ab', 702-706cb', 702-706db', and 702-706th') to obtain native domain singular values tensors.

At 612, the SVD result of the higher dimensional tensor is obtained based on the native domain left singular vectors tensors, the native domain right singular vectors tensors, and the native domain singular values tensors obtained from the inverse Fourier transform, as well as the previously obtained native domain singular values tensors (e.g., 702b-706b, 702g-706g, and 702e-706e).

As before with the SVD for a 3-dimensional tensor, the SVD result of the higher dimensional tensor can be output in whole or in part. For example, the most significant SVD value and vectors can be output to represent the higher dimensional tensor in a compressed/de-noised form. Although a 4-dimensional tensor is shown in the example of 7A-7G, the process can be expanded for higher dimensional tensors by obtaining the SVD factors for 4-dimensional tensors used to form the higher dimensional tensor then performing inverse Fourier transform on the SVD factors.

A tensor analysis technique has been disclosed. The technique allows for spectral analysis of tensors of three or higher dimensions and produces accurate, consistent decomposition results. The technique is also highly efficient, parallelizable, and provides results that can be used to represent large data in a compressed manner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of tensor spectral analysis, comprising:
   obtaining a set of Fourier domain singular value decomposition (SVD) factors of a first tensor representing data in multiple dimensions, wherein:
      the data corresponds to one or more application-specific variates;
      the multiple dimensions include a dimension that represents a measurement; and
      the obtaining of the set of Fourier domain SVD factors includes:
         performing Fourier transform on the first tensor along a first dimension to obtain a Fourier domain tensor;
         performing SVD on the Fourier domain tensor to obtain a first set of Fourier domain SVD tensors;
         performing inverse Fourier transform on at least some of the first set of Fourier domain SVD tensors to obtain a set of native domain tensors;
         performing Fourier transform on at least some of the set of native domain tensors to obtain a second set of Fourier domain tensors; and
         performing SVD on at least some of the second set of Fourier domain tensors to obtain a second set of Fourier domain SVD tensors;
   obtaining an SVD result based at least in part on the set of Fourier domain SVD factors of the first tensor, wherein the SVD result indicates energy content of the first tensor; and
   outputting at least a portion of the SVD result to be displayed, stored, further processed, or any combination thereof.

2. The method of claim 1, wherein at least some of the Fourier transform, the SVD, and/or the inverse Fourier transform are performed on a plurality of processors in parallel.

3. The method of claim 1, further comprising:
   reorienting matrices in at least some of the first set of Fourier domain SVD tensors; and
   reorienting matrices in at least some of the second set of Fourier domain tensors to provide the set of Fourier domain SVD factors.

4. The method of claim 3, wherein:
the first set of Fourier domain SVD tensors includes a first Fourier domain left singular vectors tensor, a Fourier domain singular values tensor, and a first Fourier domain right singular vectors tensor; and
the reorienting of matrices in at least some of the first set of Fourier domain SVD tensors includes reorienting matrices in the first Fourier domain left singular vectors tensor according to dominance of singular vectors in the first Fourier domain left singular vectors tensor, and reorienting matrices in the first Fourier domain right singular vectors tensor according to dominance of singular vectors in the first Fourier domain right singular vectors tensor.

5. The method of claim 4, wherein the reorienting of the matrices in at least some of the second set of Fourier domain tensors includes reorienting:
matrices in a Fourier domain left-left singular vectors tensor according to dominance of singular vectors in the Fourier domain left-left singular vectors tensor;
matrices in a Fourier domain left-right singular vectors tensor according to dominance of singular vectors in the Fourier domain left-right singular vectors tensor;
matrices in a Fourier domain right-left singular vectors tensor according to dominance of singular vectors in the Fourier domain right-left singular vectors tensor; and
matrices in a Fourier domain right-right singular vectors tensor according to dominance of singular vectors in the Fourier domain right-right singular vectors tensor.

6. The method of claim 5, wherein the set of Fourier domain SVD factors of the first tensor includes a reoriented Fourier domain left-left singular vectors tensor, a Fourier domain left singular values tensor, a reoriented Fourier domain left-right singular vectors tensor, a reoriented Fourier domain right-left singular vectors tensor, a Fourier domain right singular values tensor, a reoriented Fourier domain right-right singular vectors tensor, and the Fourier domain singular values tensor.

7. The method of claim 3, further comprising performing inverse Fourier transform on:
a reoriented Fourier domain left-left singular vectors tensor to obtain a native domain left-left singular vectors tensor;
a Fourier domain left singular values tensor to obtain a native domain left singular values tensor;
a reoriented Fourier domain left-right singular vectors tensor to obtain a native domain left-right singular vectors tensor;
a reoriented Fourier domain right-left singular vectors tensor to obtain a native domain right-left singular vectors tensor;
a Fourier domain right singular values tensor to obtain a native domain right singular values tensor; and
a reoriented Fourier domain right-right singular vectors tensor to obtain a native domain right-right singular vectors tensor.

8. The method of claim 7, wherein the SVD result of the first tensor includes:
at least a portion of the native domain left-left singular vectors tensor;
at least a portion of the native domain left singular values tensor;
at least a portion of the native domain left-right singular vectors tensor;
at least a portion of the native domain right-left singular vectors tensor;
at least a portion of the native domain right singular values tensor; and
at least a portion of the native domain right-right singular vectors tensor.

9. The method of claim 1, wherein the first set of Fourier domain SVD tensors includes a first Fourier domain left singular vectors tensor, a Fourier domain singular values tensor, and a first Fourier domain right singular vectors tensor.

10. The method of claim 9, wherein the performing of the inverse Fourier transform on the at least some of the first set of Fourier domain SVD tensors includes performing inverse Fourier transform on:
the first Fourier domain left singular vectors tensor along the first dimension to obtain a native domain left singular vectors tensor;
the first Fourier domain right singular vectors tensor along the first dimension to obtain a native domain right singular vectors tensor; and
the Fourier domain singular values tensor along the first dimension to obtain a native domain singular values tensor.

11. The method of claim 10, wherein the performing of the Fourier transform on the at least some of the set of native domain tensors to obtain the second set of Fourier domain tensors includes performing Fourier transform on:
the native domain left singular vectors tensor along a second dimension to obtain a second Fourier domain left singular vectors tensor; and
the native domain right singular vectors tensor along a third dimension to obtain a second Fourier domain right singular vectors tensor.

12. The method of claim 11, wherein the performing of SVD on at least some of the second set of Fourier domain tensors to obtain the second set of Fourier domain SVD tensors includes performing SVD on:
the second Fourier domain left singular vectors tensor to obtain a Fourier domain left-left singular vectors tensor, a Fourier domain left singular values tensor, and a Fourier domain left- right singular vectors tensor; and
the second Fourier domain right singular vectors tensor to obtain a Fourier domain right- left singular vectors tensor, a Fourier domain right singular values tensor, and a Fourier domain right-right singular vectors tensor.

13. The method of claim 1, wherein the at least portion of the SVD result represents a compressed form of the first tensor or a compressed form of a higher order tensor that includes the first tensor.

14. The method of claim 1, wherein the SVD result that is obtained is the SVD result of the first tensor.

15. The method of claim 1, wherein the obtaining of the SVD result based at least in part on the set of Fourier domain SVD factors of the first tensor includes performing inverse Fourier transform on a second set of reoriented Fourier domain SVD tensors.

16. The method of claim 1, wherein:
the first tensor is a 3-dimensional tensor that is included in a higher dimensional tensor that is four-dimensional or higher;
the higher dimensional tensor is of four or more dimensions, and includes one or more additional 3-dimensional tensors; and
the SVD result that is obtained is an SVD result of the higher dimensional tensor.

17. The method of claim 16, further comprising:
obtaining one or more additional sets of Fourier domain SVD factors of the one or more additional 3-dimensional tensors;
performing Fourier transforms on vectors tensors in the set of Fourier domain SVD factors of the first tensor and the one or more additional sets of Fourier domain SVD factors of the one or more additional 3-dimensional tensors, along a fourth dimension, to obtain corresponding Fourier domain vectors tensors;
performing SVD on the corresponding Fourier domain vectors tensors to obtain corresponding Fourier domain left singular vectors tensors, Fourier domain right singular vectors tensors, and Fourier domain singular values tensors;
reorienting the Fourier domain left singular vectors tensors, Fourier domain right singular vectors tensors, and Fourier domain singular values tensors;
performing inverse Fourier transform on:
the reoriented Fourier domain left singular vectors tensors to obtain native domain left singular vectors tensors;
the reoriented Fourier domain right singular vectors tensors to obtain native domain right singular vectors tensors; and
the reoriented Fourier domain singular values tensors to obtain native domain singular values tensors; and
obtaining the SVD result of the higher dimensional tensor based at least in part on the native domain left singular vectors tensors, the native domain right singular vectors tensors, and the native domain singular values tensors.

18. The method of claim 1, wherein one or more dominant terms in the SVD result are output and remaining terms are omitted.

19. A system of tensor spectral analysis, comprising:
one or more processors configured to:
obtain a set of Fourier domain singular value decomposition (SVD) factors of a first tensor representing data in multiple dimensions, wherein:
the data corresponds to one or more application-specific variates;
the multiple dimensions include a dimension that represents a measurement and
to obtain the set of Fourier domain SVD factors includes to:
perform Fourier transform on the first tensor along a first dimension to obtain a Fourier domain tensor;
perform SVD on the Fourier domain tensor to obtain a first set of Fourier domain SVD tensors;
perform inverse Fourier transform on at least some of the first set of Fourier domain SVD tensors to obtain a set of native domain tensors;
perform Fourier transform on at least some of the set of native domain tensors to obtain a second set of Fourier domain tensors; and
perform SVD on at least some of the second set of Fourier domain tensors to obtain a second set of Fourier domain SVD tensors;
obtain an SVD result based at least in part on the set of Fourier domain SVD factors of the first tensor, wherein the SVD result indicates energy content of the first tensor; and
output at least a portion of the SVD result to be displayed, stored, further processed, or any combination thereof; and
one or more memories coupled to the one or more processors and configured to provide the one or more processors with instructions.

20. The system of claim 19, wherein the system comprises a plurality of processors, and at least some of the Fourier transform, the SVD, and/or the inverse Fourier transform are performed on the plurality of processors in parallel.

21. A computer program product for tensor spectral analysis, the computer program product being embodied in a tangible computer readable storage medium and comprising computer instructions for:
obtaining a set of Fourier domain singular value decomposition (SVD) factors of a first tensor representing data in multiple dimensions, wherein:
the data corresponds to one or more application-specific variates;
the multiple dimensions include a dimension that represents a measurement and
the obtaining of the set of Fourier domain SVD factors includes:
performing Fourier transform on the first tensor along a first dimension to obtain a Fourier domain tensor;
performing SVD on the Fourier domain tensor to obtain a first set of Fourier domain SVD tensors;
performing inverse Fourier transform on at least some of the first set of Fourier domain SVD tensors to obtain a set of native domain tensors;
performing Fourier transform on at least some of the set of native domain tensors to obtain a second set of Fourier domain tensors; and
performing SVD on at least some of the second set of Fourier domain tensors to obtain a second set of Fourier domain SVD tensors;
obtaining an SVD result based at least in part on the set of Fourier domain SVD factors of the first tensor, wherein the SVD result indicates energy content of the first tensor; and
outputting at least a portion of the SVD result to be displayed, stored, further processed, or any combination thereof.

22. The computer program product of claim 21, wherein at least some of the Fourier transform, the SVD, and/or the inverse Fourier transform are performed on a plurality of processors in parallel.

* * * * *

UNITED STATES PATENT AND TRADEMARK OFFICE
CERTIFICATE OF CORRECTION

PATENT NO. : 10,740,341 B1
APPLICATION NO. : 15/944474
DATED : August 11, 2020
INVENTOR(S) : Roy Batruni Page 1 of 1

It is certified that error appears in the above-identified patent and that said Letters Patent is hereby corrected as shown below:

In the Specification

In Column 13, Line(s) 60, delete "51" and insert --5I--, therefor.
In Column 15, Line(s) 62, delete "706th'" and insert --706fb'--, therefor.

Signed and Sealed this
First Day of December, 2020

Andrei Iancu
*Director of the United States Patent and Trademark Office*